US011018361B2

(12) United States Patent
Watanabe et al.

(10) Patent No.: US 11,018,361 B2
(45) Date of Patent: May 25, 2021

(54) FUEL CELL STACK DEVICE AND FUEL CELL DEVICE

(71) Applicant: MORIMURA SOFC TECHNOLOGY CO., LTD., Komaki (JP)

(72) Inventors: Naoki Watanabe, Kitakyushu (JP); Toshiharu Otsuka, Kitakyushu (JP); Akira Kawakami, Kitakyushu (JP); Fumio Tsuboi, Kitakyushu (JP); Takuya Matsuo, Kitakyushu (JP); Takuya Hoshiko, Kitakyushu (JP); Shuhei Tanaka, Kitakyushu (JP)

(73) Assignee: MORIMURA SOFC TECHNOLOGY CO., LTD., Aichi (JP)

(*) Notice: Subject to any disclaimer, the term of this patent is extended or adjusted under 35 U.S.C. 154(b) by 198 days.

(21) Appl. No.: 15/827,857

(22) Filed: Nov. 30, 2017

(65) Prior Publication Data

US 2018/0159156 A1 Jun. 7, 2018

(30) Foreign Application Priority Data

Dec. 2, 2016 (JP) .............................. JP2016-235462
Sep. 25, 2017 (JP) .............................. JP2017-183330

(51) Int. Cl.
*H01M 8/0612* (2016.01)
*H01M 8/04014* (2016.01)
(Continued)

(52) U.S. Cl.
CPC ......... *H01M 8/0618* (2013.01); *H01M 8/004* (2013.01); *H01M 8/04014* (2013.01);
(Continued)

(58) Field of Classification Search
CPC .... H01M 8/016; H01M 8/2484; H01M 8/004; H01M 8/04014; H01M 8/04074;
(Continued)

(56) References Cited

U.S. PATENT DOCUMENTS 5,047,299 A * 9/1991 Shockling ............. H01M 8/243
429/415
2005/0089731 A1* 4/2005 Ogiwara ........... H01M 8/04022
429/413
(Continued)

FOREIGN PATENT DOCUMENTS

DE 102014209754 A1 11/2015
EP 2063479 A1 5/2009
(Continued)

OTHER PUBLICATIONS

Extended European Search Report in European Application No. 17204752.4 dated Apr. 17, 2018, pp. 1-10.
(Continued)

*Primary Examiner* — Helen Oi K Conley
(74) *Attorney, Agent, or Firm* — Brinks Gilson & Lione

(57) ABSTRACT

To provide a fuel cell stack device that is applicable to miniaturization of the device and does not require a pipe for discharging off-gas up to a combustion section. A fuel cell stack device including: a first manifold 2a for supplying fuel gas supplied from a reformer 12 to a plurality of fuel cells provided in a first cell stack from above, the first manifold being connected to upper ends of the plurality of fuel cells provided in the first cell stack 10a; and a second manifold 2b for recovering fuel gas discharged from the first cell stack, and supplying the recovered fuel gas to the plurality of fuel cells provided in the second cell stack from below, the second manifold being connected to lower ends of the plurality of fuel cells provided in the second cell stack 10b.

4 Claims, 20 Drawing Sheets

(51) Int. Cl.
*H01M 8/04089* (2016.01)
*H01M 8/249* (2016.01)
*H01M 8/00* (2016.01)
*H01M 8/243* (2016.01)
*H01M 8/2484* (2016.01)
*H01M 8/04007* (2016.01)
*H01M 8/2475* (2016.01)
*H01M 8/2485* (2016.01)
*H01M 8/124* (2016.01)
*F28D 21/00* (2006.01)

(52) U.S. Cl.
CPC ... *H01M 8/04074* (2013.01); *H01M 8/04089* (2013.01); *H01M 8/0625* (2013.01); *H01M 8/243* (2013.01); *H01M 8/249* (2013.01); *H01M 8/2475* (2013.01); *H01M 8/2484* (2016.02); *H01M 8/2485* (2013.01); *F28D 2021/0043* (2013.01); *H01M 2008/1293* (2013.01); *H01M 2300/0074* (2013.01)

(58) Field of Classification Search
CPC .......... H01M 8/04089; H01M 8/0625; H01M 8/246; H01M 8/2475; H01M 8/2485; H01M 8/249
See application file for complete search history.

(56) References Cited

U.S. PATENT DOCUMENTS

2013/0115537 A1 5/2013 Chung
2017/0350025 A1 12/2017 Oda et al.

FOREIGN PATENT DOCUMENTS

| JP | S59-149662 A | 8/1984 |
| JP | 2006-331881 A | 12/2006 |
| JP | 2016-100138 A | 5/2016 |
| WO | WO 2010/066461 A1 | 6/2010 |
| WO | WO2016/104361 A1 | 6/2016 |

OTHER PUBLICATIONS

Office Action in Europe Application No. 17204752.4, dated Jun. 24, 2020, 14 pages.

\* cited by examiner

FUEL CELL STACK DEVICE AND FUEL CELL DEVICE

RELATED APPLICATIONS

This application claims priority under 35 U.S.C. § 119 to Japanese Patent Application Nos. 2016-235462 filed on Dec. 2, 2016 and 2017-183330 filed on Sep. 25, 2017, the entire contents of which are hereby incorporated by reference.

BACKGROUND OF THE INVENTION

1. Field of the Invention

The present invention relates to a fuel cell stack device, and a fuel cell device. Particularly, the present invention relates to a fuel cell stack device and a fuel cell device that generate electricity by reaction of fuel gas obtained by reforming raw material gas, and oxidant gas.

2. Description of the Related Art

A solid oxide fuel cell device (Solid Oxide Fuel Cell: hereinafter also referred to as an "SOFC") is a fuel cell device which includes fuel cells consisting of solid electrolyte having an oxide ion conductivity as electrolyte, electrodes disposed on the both sides of the solid electrolyte, and the like. The solid oxide fuel cell device, which has a plurality of the fuel cells disposed in a module container, extracts power generated by electrical generation reaction by supplying fuel gas to one electrode (fuel electrode) of fuel cells and supplying oxidant gas (such as air and oxygen) to the other electrode (air electrode). The solid oxide fuel cell device operates at a relatively high temperature of, for example, about 700 to 1000° C. with respect to other fuel cell device such as a polymer electrolyte fuel cell device.

As the fuel cell used in the solid oxide fuel cell device, a flat cylindrical cell described in Japanese Patent Laid-Open No. 2015-082389, a cylindrical unit cell described in Japanese Patent No. 5234554, a cylindrical horizontal-stripe type cell described in Japanese Patent Laid-Open No. 7-130385, and the like are known.

As such a fuel cell device, a high fuel utilization rate (Uf), and high power generation efficiency are demanded. In order to improve the fuel utilization rate and the power generation efficiency, as described in Japanese Patent Laid-Open No. 2016-100136, and Japanese Patent Laid-Open No. 2016-100138, a two-stage cascade type fuel cell device is proposed, in which fuel cell arrays are divided into two cell groups which are at a first stage and a second stage, and cascade utilization of fuel gas of supplying fuel gas remaining in power generation of the fuel cell of the first stage to the fuel cell of the second stage is promoted.

However, it is difficult to apply such a two-stage cascade type fuel cell a fuel cell stack and a fuel cell device using conventional cylindrical fuel cells. This is because a problem occurs in that the configuration of the fuel cell device becomes complicated, and miniaturization of the fuel cell device is hindered.

Particularly, in the fuel cell device, fuel gas (off-gas) that is left unused in electrical generation is combusted to heat a reformer and reform raw material gas into fuel gas containing hydrogen in the reformer. However, in a case where fuel cells of two stages are applied, when fuel gas is supplied to a fuel cell on a primary side from below the fuel cell, fuel gas that is left unused in the fuel cell on the primary side is turned back above the fuel cell. This fuel gas is supplied to a fuel cell on a secondary side. Therefore, off-gas is discharged from below the fuel cell on the secondary side. In such a case, a pipe for discharging off-gas up to a combustion section installed above the conventional fuel cell is required.

The present invention has been made in view of the above problem. The present invention has the object of providing a simple device suppressing complication and applicable to miniaturization, in a two-stage cascade type fuel cell stack device using columnar fuel cells. Particularly, the present invention has the object of providing a fuel cell stack device that does not require a pipe for discharging off-gas up to a combustion section.

SUMMARY OF THE INVENTION

The present invention is a fuel cell stack device for generating electricity by reaction of fuel gas and oxidant gas, the fuel cell stack device including: a plurality of columnar fuel cells each having a gas flow path extending in a longitudinal direction therein; a plurality of cell stacks each having the plurality of fuel cells disposed in parallel to each other with respect to the longitudinal direction, and including a first cell stack and a second cell stack arranged in a direction orthogonal to the longitudinal direction; a reformer that reforms raw material gas into fuel gas containing hydrogen; a first manifold connected to upper ends of the plurality of fuel cells provided in the first cell stack and supplying the fuel gas supplied from the reformer to the plurality of fuel cells provided in the first cell stack from above; and a second manifold connected to lower ends of the plurality of fuel cells provided in the second cell stack, recovering fuel gas discharged from the first cell stack, and supplying the recovered fuel gas to the plurality of fuel cells provided in the second cell stack from below.

According to the present invention having the above configuration, remaining fuel gas used in the first cell group flows into the second cell group, and is further consumed, and therefore it is possible to increase the fuel utilization rate. Additionally, the remaining fuel gas used in the first cell group can be supplied to the second cell group without using a special pipe or a fuel gas distributor, and therefore it is possible to easily miniaturize the fuel cell stack.

According to the present invention, fuel gas is supplied from the upper end of the first cell stack, and fuel gas recovered through the second manifold is supplied from the lower end of the second cell stack, and therefore it is possible to discharge off-gas from the upper end of the second cell stack. Consequently, it is possible to send the off-gas up to a combustion section without providing a new pipe.

In the present invention, the plurality of cell stacks are preferably composed of only the first cell stack and the second cell stack, and the first cell stack and the second cell stack are each preferably made up of the plurality of fuel cells arranged in line.

According to the present invention, the plurality of cell stacks are composed of only two lines of the cell stacks, and therefore it is possible to miniaturize the fuel cell stack device.

In the present invention, the reformer is preferably provided above the second cell stack.

According to the present invention, it is possible to configure a cascade type fuel cell without largely changing a structure of a conventional fuel cell device.

An aspect of the fuel cell device according to the present invention is a fuel cell device including a plurality of columnar fuel cells that generate electricity with fuel gas flowing in inner flow paths and oxidant gas supplied to outer surfaces, wherein the plurality of fuel cells are formed of a first cell group and a second cell group, the plurality of fuel cells included in the first cell group and the second cell group are erected such that the respective inner flow paths are in communication with inside of a second manifold, upper ends of the plurality of fuel cells included in the first cell group are fixed such that the inner flow paths are in communication with inside of a first manifold, and upper ends of the fuel cells included in the second cell group are opened in order to discharge and combust fuel gas that is discharged from the upper ends and is not used for electrical generation.

According to this aspect, fuel gas used in the first cell group is supplied to the second cell group, and is further consumed in the second cell group, and therefore it is possible to increase the fuel utilization rate. Additionally, the fuel gas used in the first cell group can be supplied to the second cell group without using a special pipe or a fuel gas distributor, and therefore it is possible to easily miniaturize the fuel cell stack.

In the aspect of the present invention, longitudinal lengths of the fuel cells included in the first cell group are preferably shorter than longitudinal lengths of the fuel cells included in the second cell group.

According to this aspect, the longitudinal lengths of the fuel cells included in the first cell group are shortened, so that an average cell voltage in the first cell group and an average cell voltage in the second cell group can be made to be approximately the same. The first cell group has low water vapor partial pressure, and therefore cell potential tends to increase. However, the shortened cell length allows the electrode area to be reduced and an excess voltage to be increased, and therefore it is possible to adjust the electric potential. Therefore, it is possible to ensure the durability of the fuel cells.

In the aspect of the present invention, fuel gas supplied to the first manifold preferably sequentially flows through the inner flow paths of the fuel cells included in the first cell group, the second manifold, and the inner flow paths of the fuel cells included in the second cell group, and thereafter is discharged.

According to this aspect, after fuel gas is consumed in the first cell group, and fuel gas is consumed in the second cell group to be discharged, so that it is possible to combust unused gas. Therefore, a cell stack device is easily incorporated into a fuel cell module including a reformer.

In the aspect of the present invention, the plurality of fuel cells included in the first cell group are preferably electrically connected in series, the plurality of fuel cells included in the second cell group are preferably electrically connected in series, and the first cell group and the second cell group are preferably electrically connected in series.

According to this aspect, the fuel utilization rate in the first cell group, and the fuel utilization rate in the second cell group can be defined by a current, and therefore high efficiency of the fuel cell device is possible.

In the aspect of the present invention, the plurality of fuel cells included in the first cell group are preferably electrically connected in series, the plurality of fuel cells included in the second cell group are preferably electrically connected in series, and the first cell group and the second cell group are preferably electrically connected in parallel.

According to this aspect, the first cell group and the second cell group are connected in parallel, and therefore a current that flows in the first cell group, and a current that flows in the second cell group are balanced such that the respective electric potentials are made equipotential. Consequently, it is possible to provide a high durable fuel cell device.

In the aspect of the present invention, in top view, the first manifold preferably has two regions extending in a long side direction of a cell group composed of the plurality of fuel cells disposed in a rectangular shape on a surface orthogonal to the longitudinal directions of the fuel cells, and one region extending in a short side direction of the cell group, and the two regions extending in the long side direction are preferably connected with each other across the one region extending in the short side direction.

According to this aspect, the region where unused gas discharged from the second cell group is combusted can be disposed at proximately a central portion of the fuel cell stack device, and therefore it is possible to reduce heat release. As a result, high efficiency of the fuel cell stack device is possible.

In the aspect of the present invention, the first manifold is preferably composed of a plurality of manifolds.

According to this aspect, the plurality of manifolds are installed, so that assembling performance of the fuel cell device is facilitated.

In the aspect of the present invention, a reformer that supplies fuel gas to the first manifold is preferably provided above the plurality of fuel cells included in the second cell group, and a combustion section is preferably provided between the plurality of fuel cells included in the second cell group, and the reformer.

According to this aspect, heat of the combustion section can be efficiently transferred to the reformer, and therefore it is possible to provide a high efficient fuel cell device.

An aspect of the fuel cell device according to the present invention is a fuel cell device including a plurality of columnar fuel cells that generate electricity with fuel gas flowing in inner flow paths and oxidant gas supplied to outer surfaces, wherein the plurality of fuel cells are formed of a first cell group and a second cell group, the fuel cells included in the first cell group are erected such that the respective inner flow paths are in communication with inside of a manifold, the plurality of fuel cells included in the second cell group is provided above the plurality of fuel cells included in the first cell group in longitudinal directions of the fuel cells through insulating communication members, the inner flow paths of the plurality of fuel cells included in the second cell group are in communication with the inner flow paths of the plurality of fuel cells included in the first cell group through insulating communication members, the plurality of fuel cells included in the first cell group are electrically connected in series, a plurality of the fuel cells included in the second cell group are electrically connected in series, and the first cell group and the second cell group are electrically connected.

According to this aspect, the fuel cells in the first cell group are electrically connected in series, the fuel cells in the second cell group are electrically connected in series, and the first cell group and the second cell group are electrically connected, and therefore it is possible to make a current distribution uniform while largely ensuring the electrical generation area, and it is possible to attain a cascade type fuel cell device, and therefore it is possible to provide a high durable fuel cell device having high efficiency.

In the aspect of the present invention, the first cell group and the second cell group are preferably electrically connected in series.

According to this aspect, the fuel utilization rate in the first cell group, and the fuel utilization rate in the second cell group can be defined by a current, and therefore high efficiency of the fuel cell device is possible.

In the aspect of the present invention, the first cell group and the second cell group are preferably electrically connected in parallel.

According to this aspect, the first cell group and the second cell group are connected in parallel, and therefore a current that flows in the first cell group, and a current that flows in the second cell group are balanced such that the respective potentials are made equipotential. Consequently, it is possible to provide a high durable fuel cell device.

In the aspect of the present invention, longitudinal lengths of the fuel cells included in the first cell group are preferably shorter than longitudinal lengths of the fuel cells included in the second cell group.

According to this aspect, the longitudinal lengths of the fuel cells included in the first cell group are shortened, so that an average cell voltage in the first cell group and an average cell voltage in the second cell group can be made to be approximately the same. The first cell group has low water vapor partial pressure, and therefore cell potential tends to increase. However, the shortened fuel cell length allows the electrode area to be reduced, so that an excess voltage can be increased, which makes it possible to adjust the potential. Therefore, it is possible to ensure the durability of the fuel cells.

In the aspect of the present invention, the two or more fuel cells among the plurality of fuel cells included in the first cell group are preferably joined by one insulating communication member.

According to this aspect, the number of the cells in the second cell group is the same as the number of the cells in the first cell group, or is less than the number of the fuel cells belonging to the first cell group, so that it is possible to further increase the fuel utilization rate. Additionally, the fuel utilization rate in the first cell group, and the fuel utilization rate in the second cell group can be made approximate, and therefore Nernst losses can be made to be approximately the same, and it is possible to eliminate unbalance of heat generation.

An aspect of the fuel cell device according to the present invention is a fuel cell device including a plurality of columnar fuel cells that generate electricity with fuel gas flowing in inner flow paths and oxidant gas supplied to outer surfaces, wherein the plurality of fuel cells are formed of a first cell group and a second cell group, the first cell group and the second cell group are arrayed apart from each other, in the plurality of fuel cells included in the first cell group, lower ends are connected and fixed such that the inner flow paths are in communication with inside of a first manifold, and upper ends are connected and fixed such that the inner flow paths are in communication with inside of a second manifold, in the plurality of fuel cells included in the second cell group, upper ends are connected and fixed such that the inner flow paths are in communication with inside of the second manifold, and lower ends are connected and fixed such that the inner flow paths are in communication with inside of a third manifold, fuel gas supplied to the first manifold sequentially flows through the inner flow paths of the plurality of fuel cells included in the first cell group, the second manifold, the inner flow paths of the plurality of fuel cells included in the second cell group, and the third manifold, and thereafter is discharged, and the number of the plurality of fuel cells included the second cell group is the same as the number of the fuel cells included in the first cell group, or less than the number of the fuel cells included in the first cell group.

According to this aspect, fuel gas used in the first cell group flows into the second cell group, and is further consumed, and therefore it is possible to increase the fuel utilization rate of the fuel cell device. Additionally, fuel gas can be consumed in the two stages without largely changing the arrangement of the fuel cells, and therefore it is possible to provide a fuel cell device having high power generation efficiency, and easily manufactured.

In the aspect of the present invention, the first manifold and the third manifold are preferably provided apart from each other.

According to this aspect, the cells are separated from each other, and the manifolds are disposed so as to be separated, and therefore it is possible to provide a fuel cell device which is easily assembled in manufacture.

In the aspect of the present invention, the first manifold and the third manifold are preferably integrally configured as a single container, and inside of the container is preferably separated into the first manifold that supplies fuel gas to the plurality of fuel cells included in the first cell group, and the third manifold that discharges fuel gas discharged from the plurality of fuel cells included in the second cell group to outside.

According to this aspect, the plurality of manifolds can be configured as the single container, and therefore it is possible to provide a fuel cell device which is easily manufactured.

In the aspect of the present invention, the plurality of fuel cells included in the first cell group are preferably electrically connected in series, the plurality of fuel cells included in the second cell group are preferably electrically connected in series, and the first cell group and the second cell group are preferably electrically connected in series.

According to this aspect, the fuel utilization rate in the first cell group, and the fuel utilization rate in the second cell group can be defined by a current, and therefore high efficiency of the fuel cell device is possible.

In the aspect of the present invention, the plurality of fuel cells included in the first cell group are preferably electrically connected in series, the plurality of fuel cells included in the second cell group are preferably electrically connected in series, and the first cell group and the second cell group are preferably electrically connected in parallel.

According to this aspect, the first cell group and the second cell group are connected in parallel, and therefore a current that flows in the first cell group, and a current that flows in the second cell group are balanced such that the respective potentials are made equipotential. Therefore, it is possible to provide high durable fuel cells.

According to the present invention, it is possible to provide a two-stage cascade type fuel cell stack device and a two-stage cascade type fuel cell device using columnar fuel cells suppressing complication of the device and having a simple configuration applicable to miniaturization. Particularly, according to the present invention, it is possible to provide a fuel cell stack device and a fuel cell device that do not require any pipe for discharging off-gas up to a combustion section.

DETAILED DESCRIPTION OF THE PREFERRED EMBODIMENTS

Hereinafter, embodiments of the present invention disclosed in this specification will be described in detail with reference to the drawings. From the following description, many improvement and other embodiments of the present invention are apparent for a person skilled in the art. Therefore, the following description should be interpreted as an exemplification, and is provided for the purpose of teaching a person skilled in the art best modes for carrying out the present invention. The details of the configuration and/or function can be substantially changed without departing from the spirits of the present invention.

Figure 1:
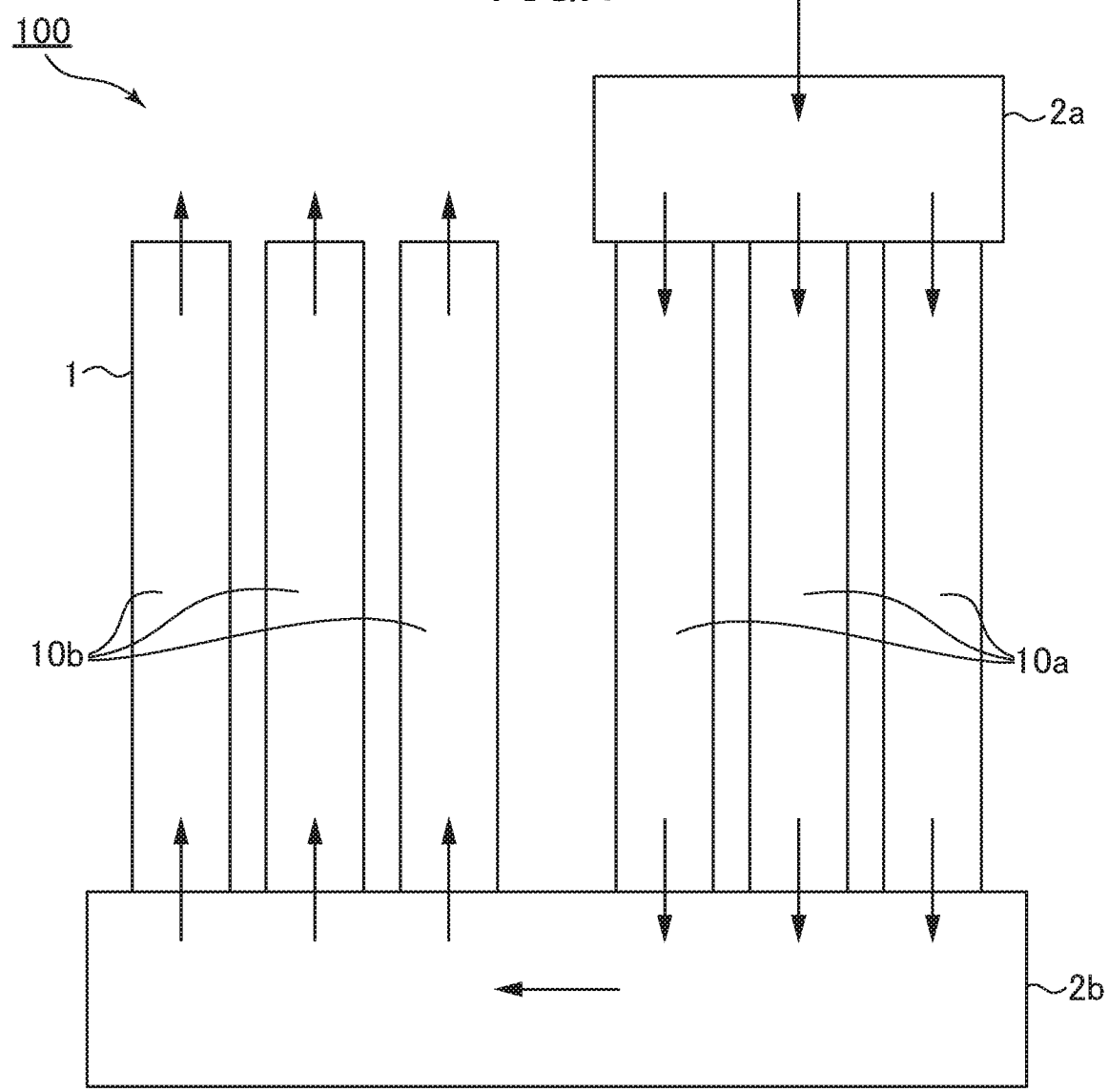
FIG. 1 is a side view for illustrating a basic configuration of a fuel cell stack device of the present invention.

First, a basic configuration of the present invention will be described. FIG. 1 is a side view of a fuel cell stack device 100 of the present invention. As illustrated in FIG. 1, the fuel cell stack device 100 includes a plurality of columnar cells 1 provided with respective gas flow paths therein, a manifold 2b, and a manifold 2a. The plurality of cells 1 are supported and fixed by erecting all first end sides (lower end sides in FIG. 1) on the single manifold 2b. Herein, the plurality of cells 1 are divided into a cell group 10a in which the manifold 2a is installed on second end sides (upper end sides in FIG. 1) of the cells, and the cells are fixed to this manifold 2a, and a cell group 10b in which the cells are not connected to the manifold 2a, and second end side are opened. The plurality of cells 1 is connected to each other so as to be electrically in series (not illustrated).

Arrows illustrated in FIG. 1 represents the flow of fuel gas. Fuel gas is supplied into the manifold 2a to flow from the second end side of the cell group 10a to the first end side. Then, the fuel gas that reaches the inside of the manifold 2b is dispersed inside the manifold 2b. Thereafter, after the fuel gas flows from the first end side towards the second end side of the cell group 10b, the fuel gas is discharged from the second end side of the cell group 10b to the outside of the fuel cell stack device 100.

Herein, consumption of fuel will be described with reference to FIG. 2A and FIG. 2B.

Figure 2A:
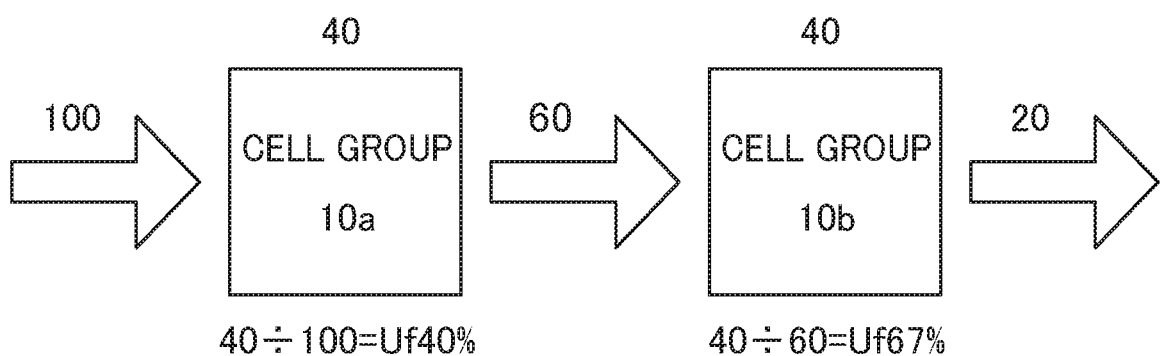
FIGS. 2A and 2B are diagrams for illustrating fuel consumption of the fuel cell stack device of the present invention.
Figure 2B:
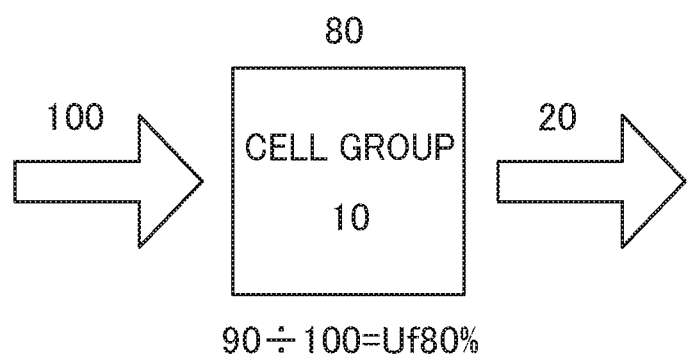

As illustrated in FIG. 2A, in a case where fuel gas is consumed in two stages of the cell group 10a and the cell group 10b to generate electricity, when the amount of the fuel gas supplied to the manifold 2a is set to 100, and the amount of fuel gas consumed in the cell group 10a is set to 40, the cell group 10a is calculated as 40÷100=0.4, and therefore the fuel utilization rate (Uf) of the cell group 10a becomes 40%. Furthermore, unused fuel gas discharged from the cell group 10a is 60, and this is supplied to the cell group 10b. When the amount of fuel gas consumed in the cell group 10b is 40 as same as the cell group 10a, the cell group 10b is calculated as 40÷60=0.666 . . . , and therefore the fuel utilization rate of the cell group 10b becomes about 67%.

On the other hand, in a case where electricity is not generated in the two stages, that is, in a case where electricity is generated in one stage, when fuel gas is similarly set to 100, and the amount consumed in a cell group is set to 80, the cell group is calculated as 80÷100=0.8, and the fuel utilization rate Uf becomes 80%.

When the fuel utilization rate becomes 80% or more, water vapor partial pressure extremely rises, so that electromotive force of the cells lowers. That is, by receiving the influence of Nernst loss, the potential of fuel cells indicates a declining trend, and power generation efficiency lowers. Additionally, when the fuel utilization rate becomes too high, electrodes of the cells are easily oxidized, and durability of the cells is deteriorated.

From the above points, electrical generation reaction is caused with the plurality of cells made up of the cell group 10a and the cell group 10b such that fuel gas is utilized in two stages, so that the fuel utilization rate in each cell group is kept low, and it is possible to increase the fuel utilization rate (i.e., power generation efficiency) of the fuel cell stack device as a whole.

In this specification, among the cell groups divided into two stages in order to implement cascade utilization of fuel gas, the cell group 10a on the upstream side is referred to as a "first stage cell group", a "first cell stack", a "first cell group" or a "primary side cell group", and the cell group 10b on the downstream side is referred to as a "second stage cell group", a "second cell stack", a "second cell group" or a "secondary side cell group", all of which are homonymous.

As described above, the two-stage configuration of the cell groups is attained, in which fuel gas is made to flow in from the manifold on the second end side (upper end side in FIG. 1), and unused gas is collected in the manifold on the first end side (lower end side in FIG. 1) and supplied to the cell group on the open side. Consequently, it is possible to provide a fuel cell stack device having a high fuel utilization rate, to which a configuration of a conventional fuel cell device can be applied with no change by simple adjustment of the number of the cells on the upstream side and the number of the cells on the downstream side without largely restricting or hindering the array of the plurality of cells, electrical series connection of the cells, the flow of air for electrical generation, or the like.

Additionally, a reformer or a vaporizer is disposed in a combustion region in which off-gas discharged from the fuel cell stack device combusts, so that it is possible to apply a placement configuration equal to the conventional fuel cell device. Therefore, it is possible to provide a high efficient and high durable fuel cell system capable of being applied to a small sized fuel cell device having output performance of 1 kw.

Figure 3:
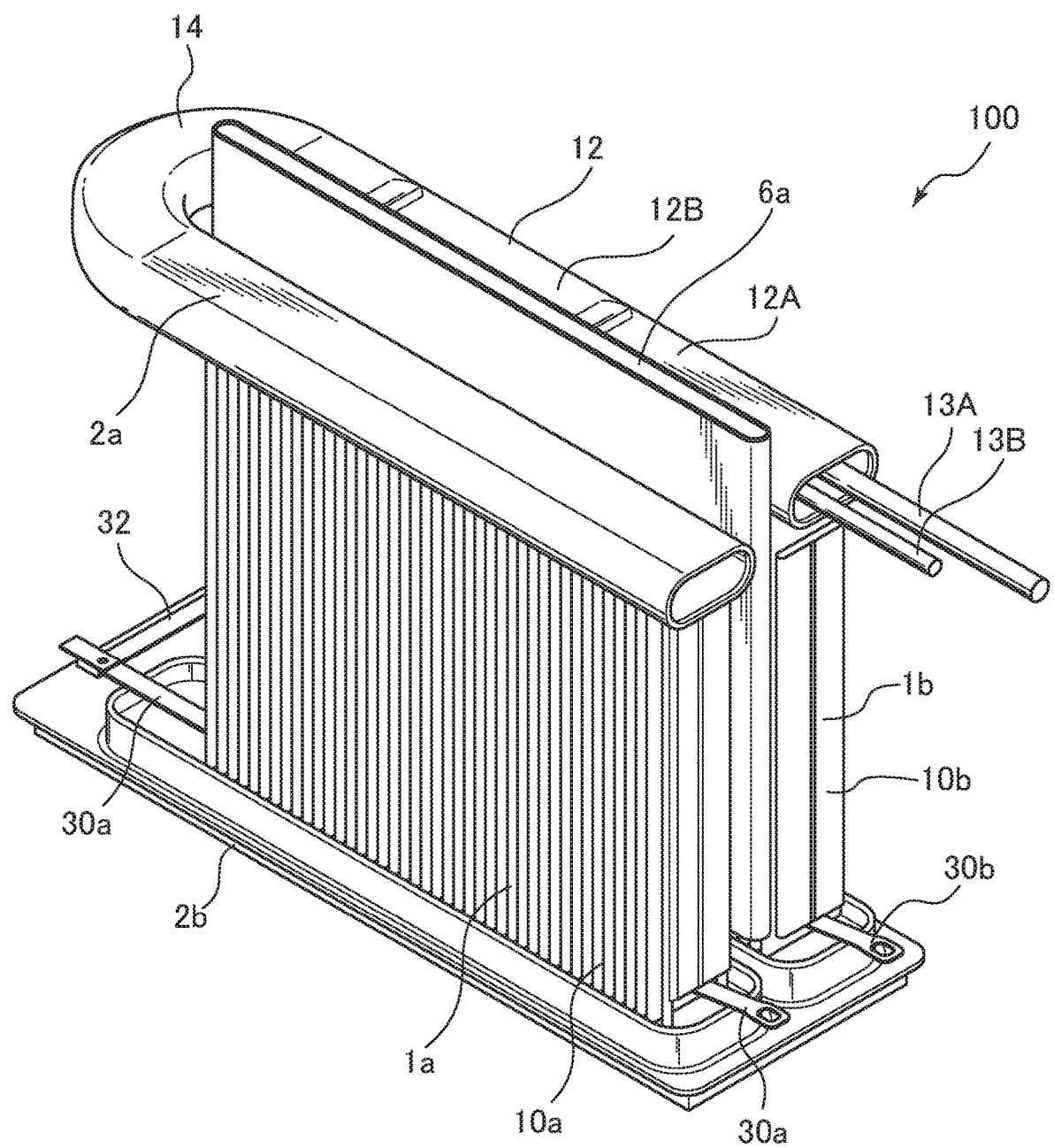
FIG. 3 is a perspective view as viewed from a first cell stack side, illustrating a fuel cell stack device according to a first embodiment of the present invention.
Figure 4:
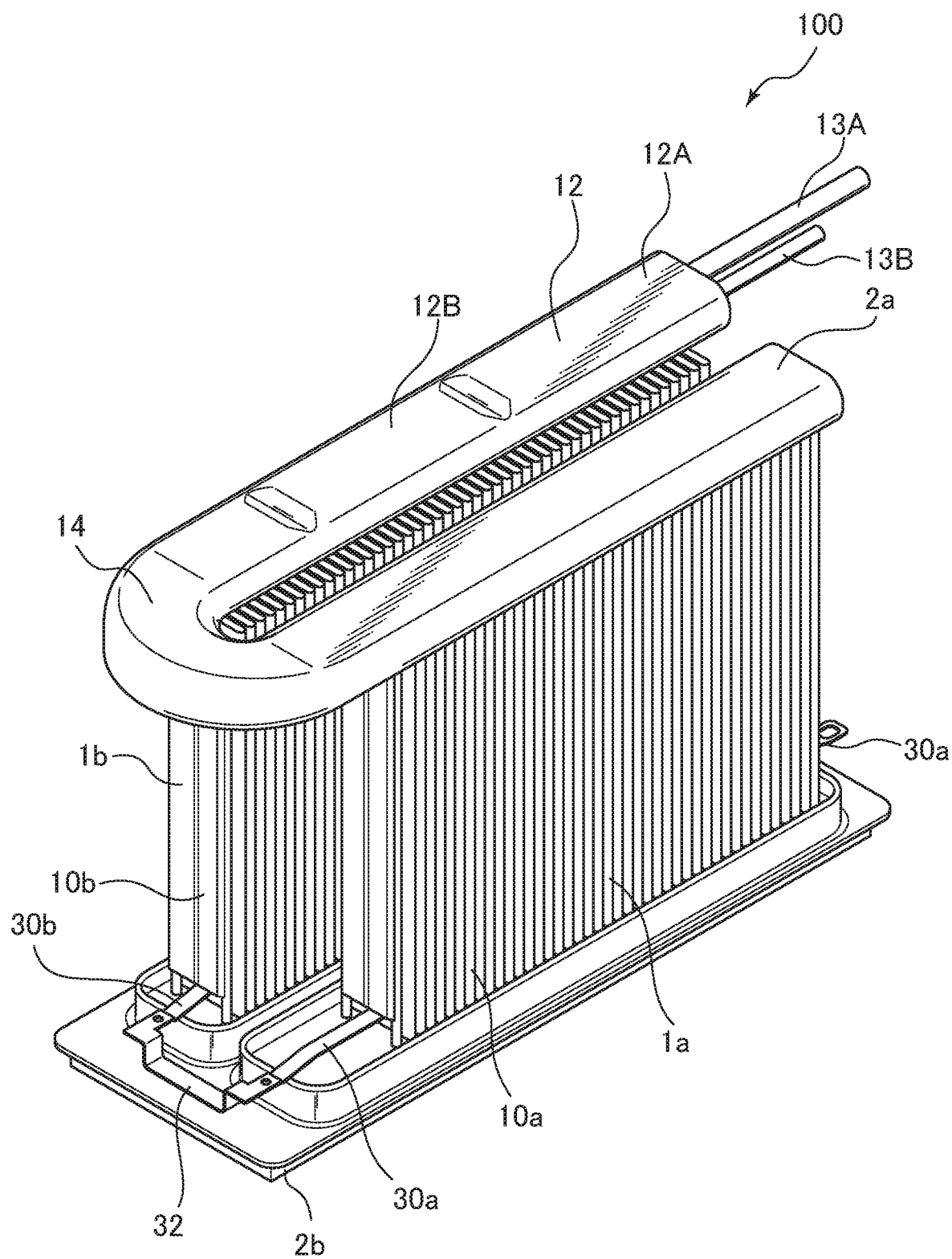
FIG. 4 is a perspective view as viewed from a second cell stack side, illustrating the fuel cell stack device according to the first embodiment of the present invention.
Figure 5:
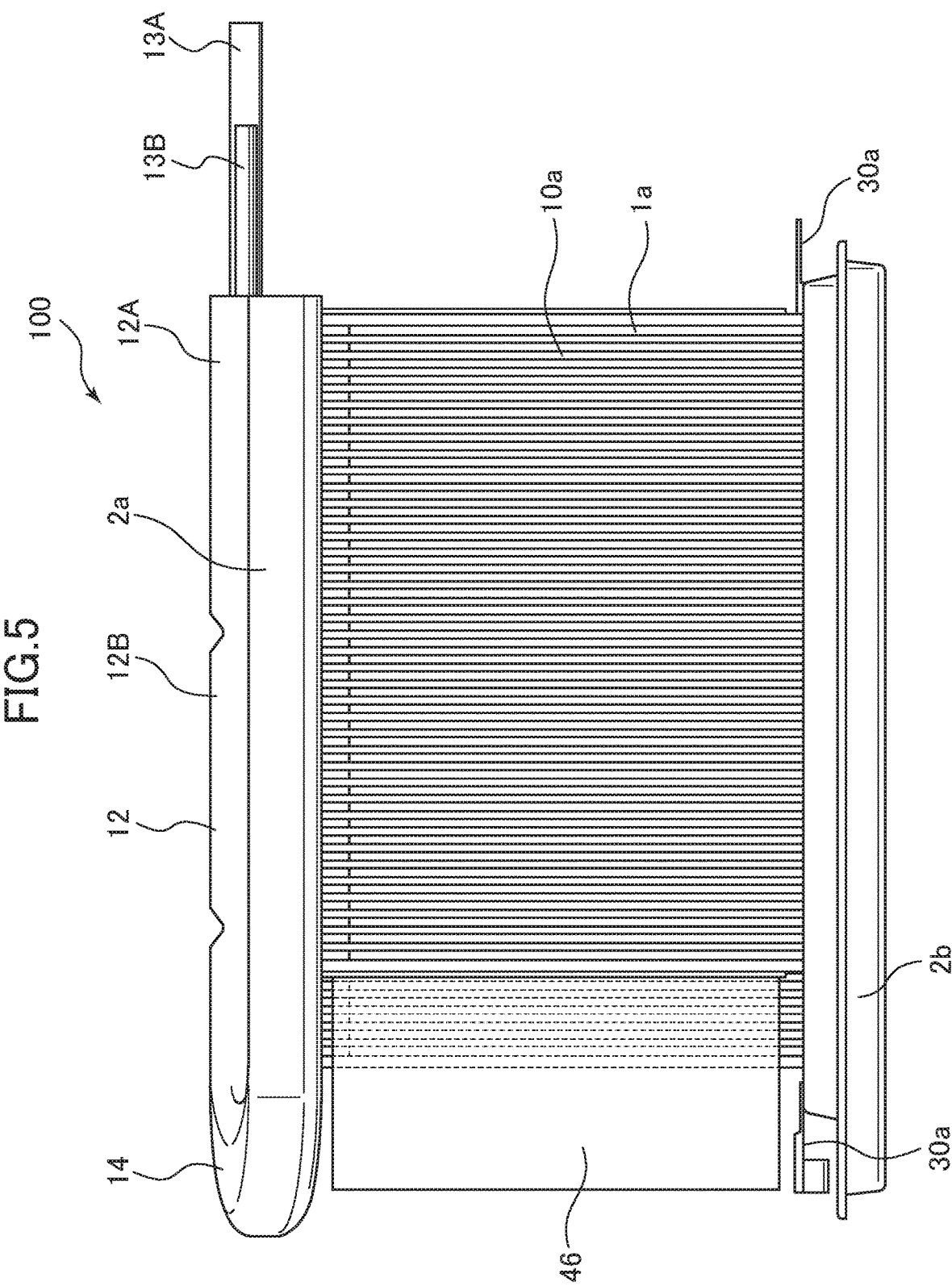
FIG. 5 is a side view as viewed from the first cell stack side, illustrating the fuel cell stack device according to the first embodiment of the present invention.
Figure 6:
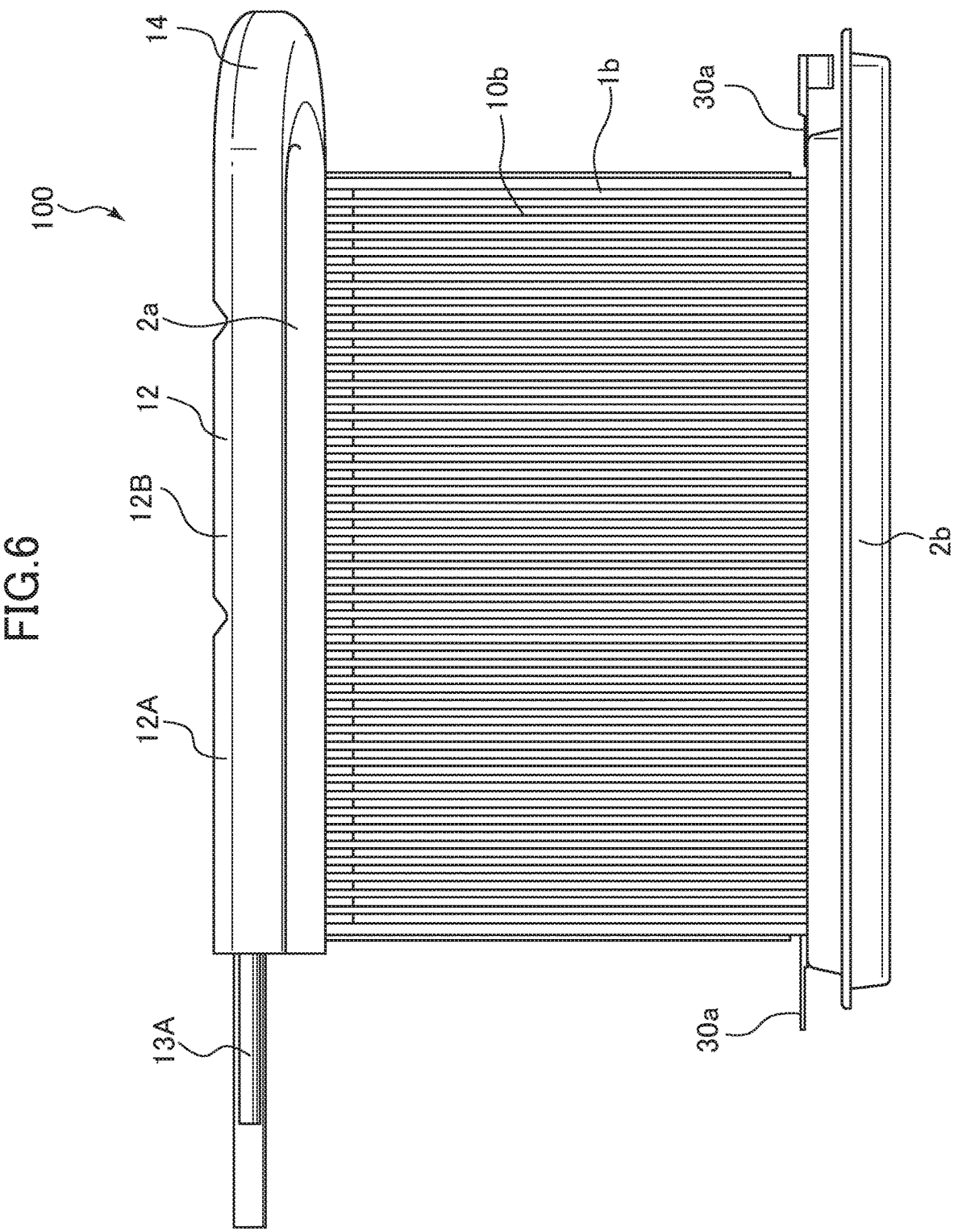
FIG. 6 is a side view as viewed from the second cell stack side, illustrating the fuel cell stack device according to the first embodiment of the present invention.
Figure 7:
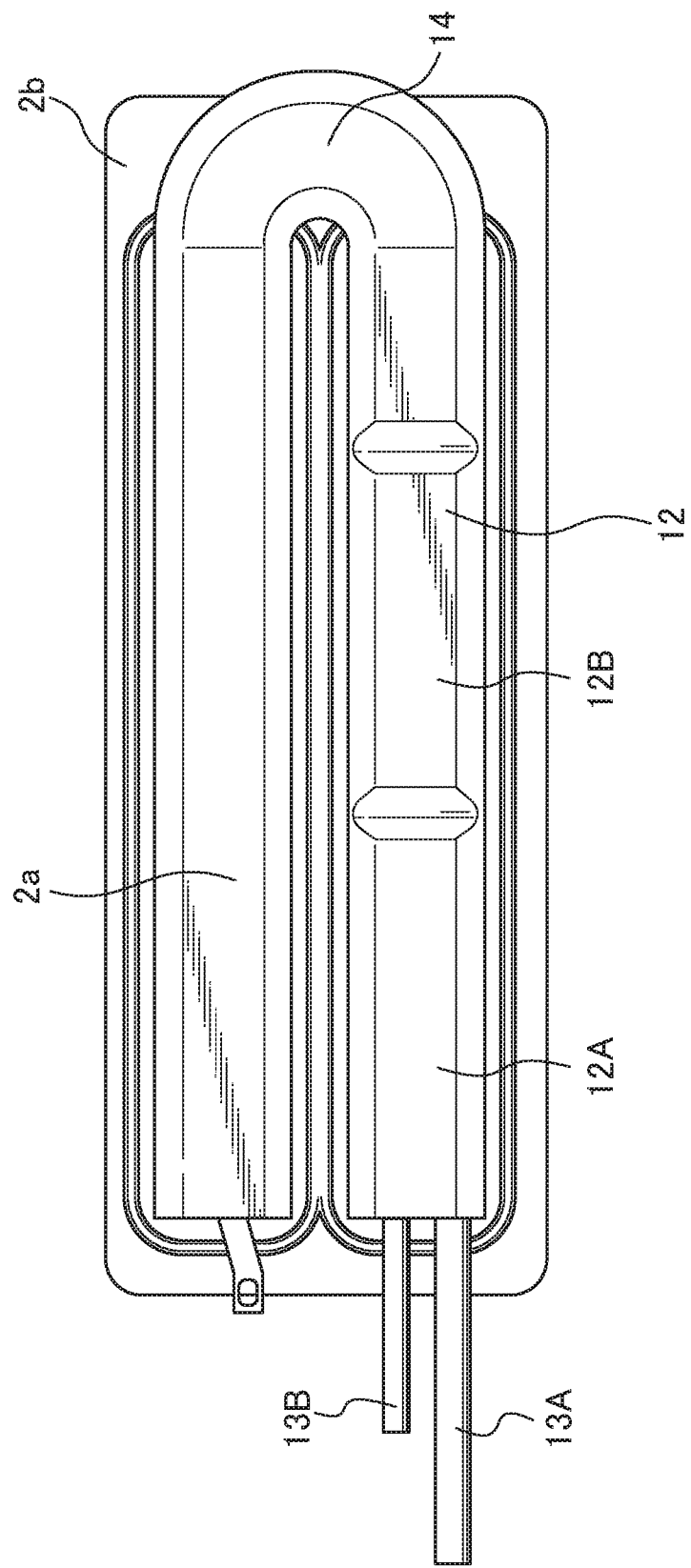
FIG. 7 is a top view of the fuel cell stack device according to the first embodiment of the present invention.
Figure 8:
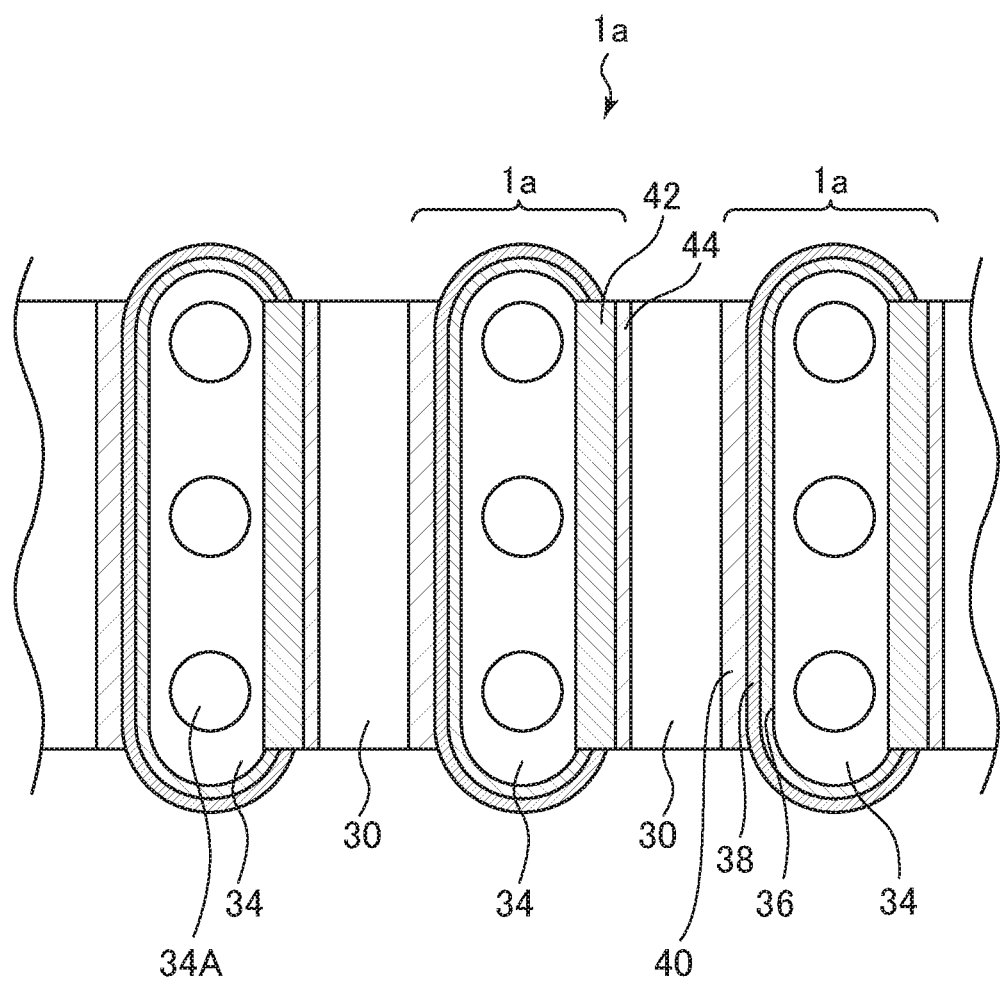
FIG. 8 is a partially horizontal sectional view of a first cell stack constituting the fuel cell stack device according to the first embodiment of the present invention.
Figure 9:
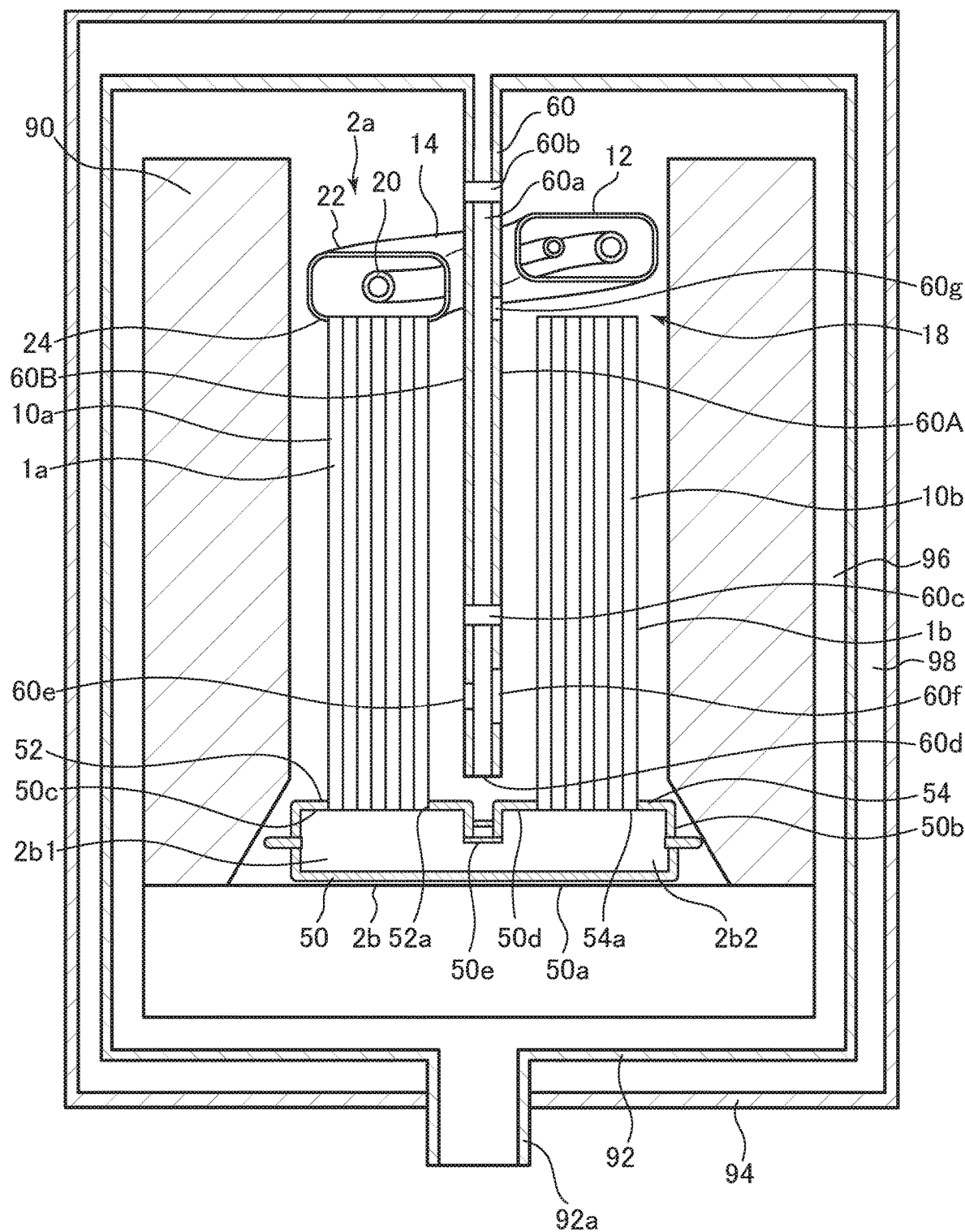
FIG. 9 is a vertical sectional view of the fuel cell stack device according to the first embodiment of the present invention.
Figure 10:
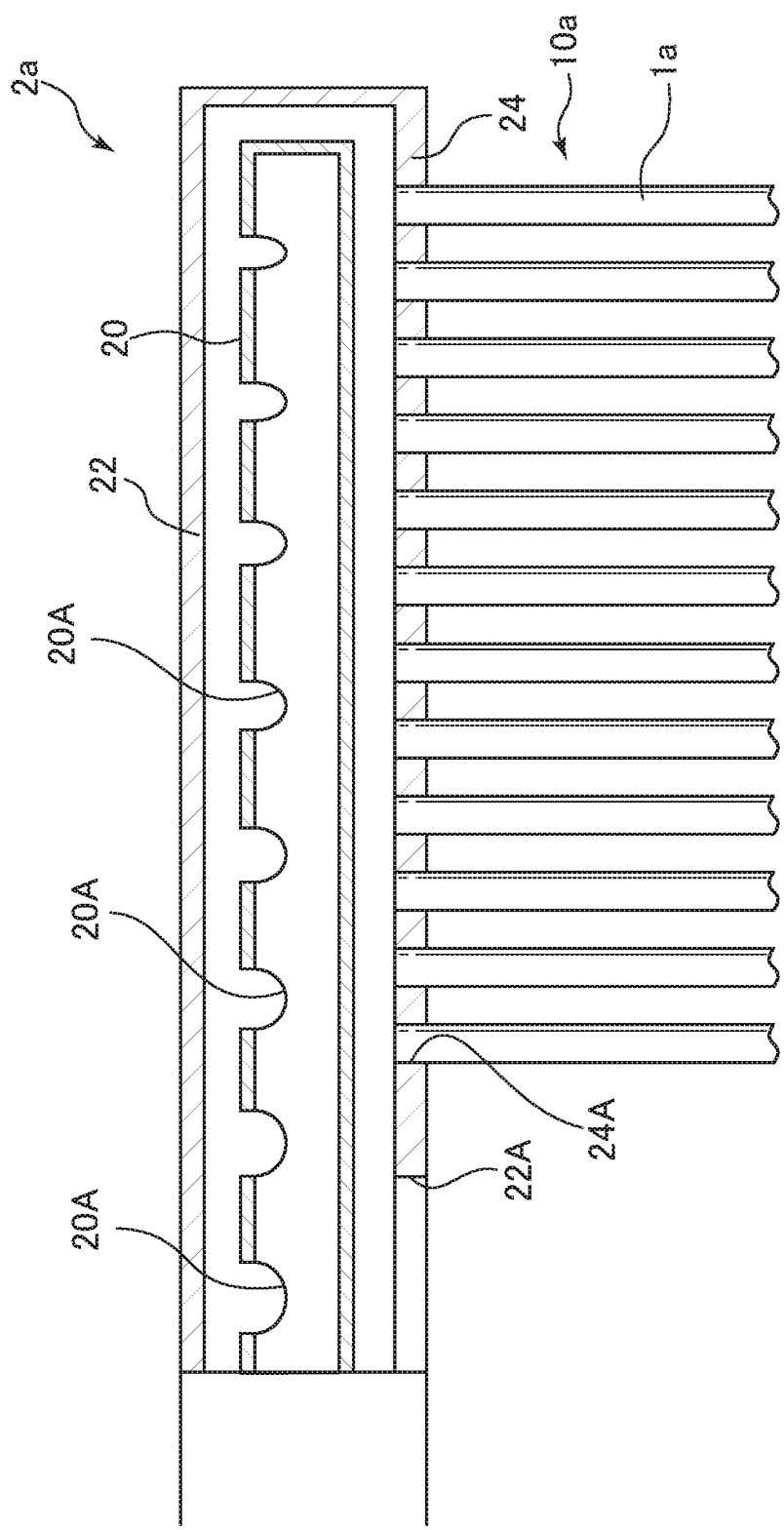
FIG. 10 is a vertical sectional view of a first manifold of the fuel cell stack device according to the first embodiment of the present invention.
Figure 11:
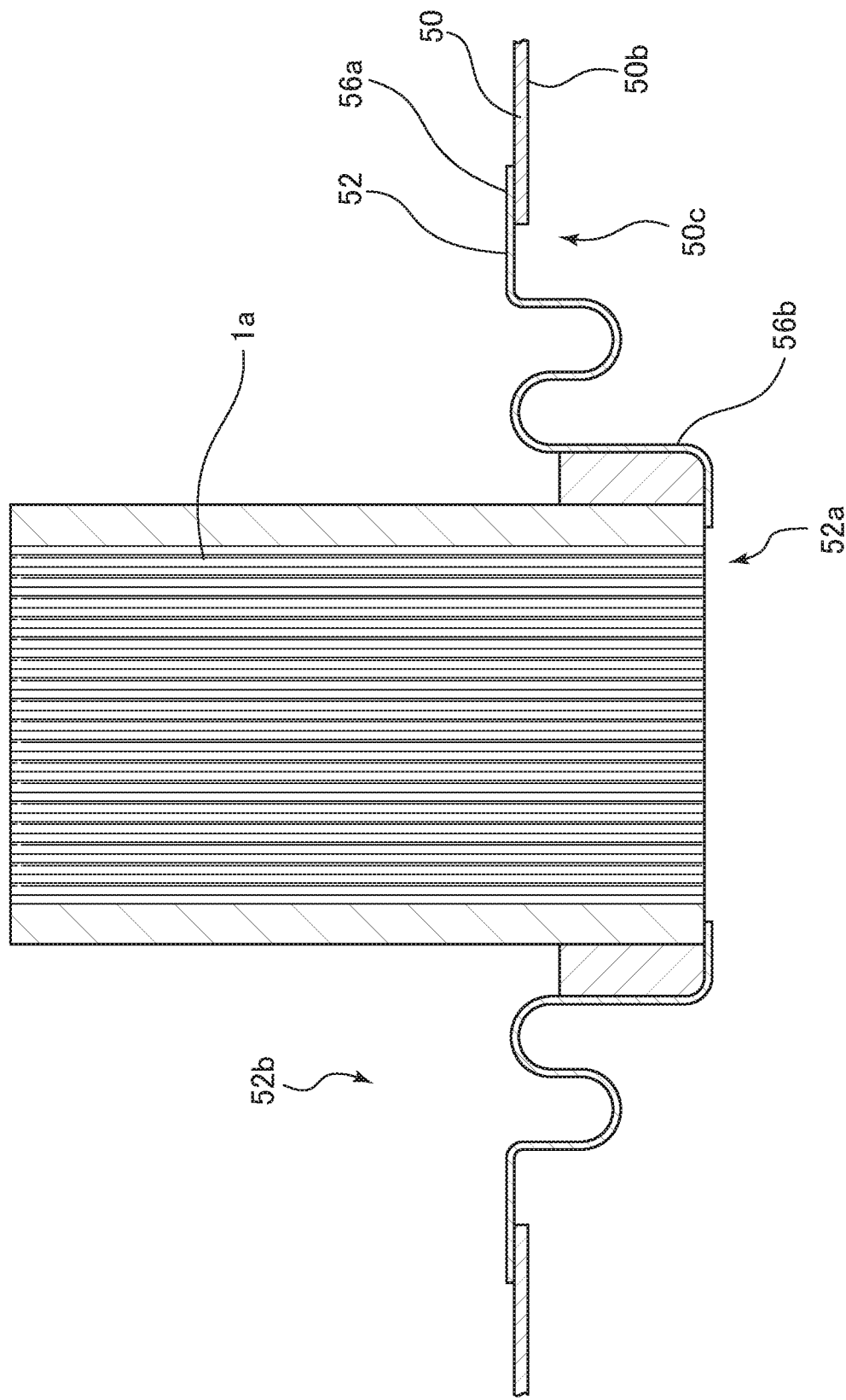
FIG. 11 is an enlarged sectional view of a connecting section between a lower ends of fuel cells of a first cell stack and a second manifold of the fuel cell stack device according to the first embodiment of the present invention.

Hereinafter, the fuel cell stack device according to the first embodiment of the present invention will be described. FIG. 3 is a perspective view as viewed from the first cell stack side, illustrating the fuel cell stack device according to the first embodiment of the present invention. FIG. 4 is a perspective view as viewed from the second cell stack side, illustrating the fuel cell stack device according to the first embodiment of the present invention. FIG. 5 is a side view as viewed from the first cell stack side, illustrating the fuel cell stack device according to the first embodiment of the present invention. FIG. 6 is a side view as viewed from the second cell stack side, illustrating the fuel cell stack device according to the first embodiment of the present invention. FIG. 7 is a top view of the fuel cell stack device according to the first embodiment of the present invention. FIG. 8 is a partially horizontal sectional view of the first cell stack constituting the fuel cell stack device according to the first embodiment of the present invention. FIG. 9 is a vertical sectional view of the fuel cell stack device according to the first embodiment of the present invention. FIG. 10 is a vertical sectional view of a first manifold of the fuel cell stack device according to the first embodiment of the present invention. FIG. 11 is an enlarged sectional view of a connecting section of lower ends of fuel cells of a first cell stack and a second manifold of the fuel cell stack device according to the first embodiment of the present invention. In FIG. 4 to FIG. 6, a partition plate is omitted.

As illustrated in FIG. 3 to FIG. 9, the fuel cell stack device 100 comprises a first cell stack 10a, a second cell stack 10b including a plurality of columnar fuel cells 1, a first manifold 2a provided above the first cell stack 10a, a second manifold 2b provided below the first cell stack 10a and the second cell stack 10b, and a reformer 12 provided above the second cell stack 10b, and having a reforming section B filled with a reforming catalyst. The reformer 12 and the first manifold 2a are connected through a connecting section 14 so as to enable fuel gas to move. Additionally, a partition plate 60 is provided between the first cell stack 10a and the second cell stack 10b. As illustrated in FIG. 9, the fuel cell stack device 100 is surrounded by a heat insulator 90. An inner housing 92 is provided on an outer periphery of the heat insulator 90, and an outer housing 94 is further mounted on an outer periphery of the inner housing 92. An exhaust gas flow path 96 is formed between the inner housing 92 and the heat insulator 90. Additionally, an air flow path 98 is formed between the inner housing 92 and the outer housing 94. An upper end of the partition plate 60 is connected to the inner housing 92. An exhaust gas discharge hole 92a in communication with the exhaust gas flow path 96 and extending up to the outside of the outer housing 94 is formed on a lower surface of the inner housing 92. Additionally, an air inflow hole (not illustrated) in communication with the air flow path 98 and extending up to the outside of the outer housing 94 is formed on a lower surface of the outer housing 94.

In the first cell stack 10a, a plurality of columnar fuel cells 1a formed with gas flow paths (inner flow paths) longitudinally extending therein are arranged in line in the horizontal direction (direction orthogonal to the longitudinal direction, lateral direction). Additionally, also in the second cell stack 10b, a plurality of columnar fuel cells 1b formed with gas flow paths longitudinally extending therein are arranged in line in the horizontal direction, similarly to the first cell stack 10a.

Respective upper ends of the fuel cells 1a composing the first cell stack 10a are connected to the first manifold 2a so as to enable fuel gas to move. Additionally, respective lower ends of the fuel cells 1a composing the first cell stack 10a are connected to one side in the short side direction of the second manifold 2b so as to enable fuel gas to move. Respective lower ends of the fuel cells 1b composing the second cell stack 10b are connected to the other side in the short side direction of the second manifold 2b so as to enable fuel gas to move. Respective upper ends of the fuel cells 1b composing the second cell stack 10b are opened, and a combustion section 18, that combusts gas discharged from the second cell stack 10b, is formed between an upper end of the second cell stack 10b and the reformer 12.

To the reformer 12, raw material gas and water (or water vapor) are supplied. The reformer 12 reforms the supplied fuel gas into fuel gas containing hydrogen by using heat of the combustion section 18. The fuel gas reformed by the reformer 12 is supplied to the first manifold 2a through the connecting section 14. The fuel gas supplied to the first manifold 2a is sent to the fuel cells 1a composing the first cell stack 10a, and flows through the inner flow paths of fuel cells 1a downwardly. At this time, electricity is generated by the fuel cells 1a of the first cell stack 10a.

The fuel gas discharged from the fuel cells 1a of the first cell stack 10a is recovered through the second manifold 2b. The fuel gas recovered through the second manifold 2b is supplied to the inner flow paths of the fuel cells 1b composing the second cell stack 10b, and flows through the inner flow paths upwardly. At this time, electricity is generated by the fuel cells 1b of the second cell stack 10b.

The fuel gas that passes through the fuel cells 1b of the second cell stack 10b is discharged to the combustion section 18 disposed above the second cell stack 10b. Then, the fuel gas, that is discharged to the combustion section 18 and is not used for electrical generation, is ignited to be combusted. In this embodiment, the group of the fuel cells includes only one first cell stack 10a, and one second cell stack 10b. However, two or more first cell stacks may be provided, two or more second cell stacks may be provided, and a third cell stack may be provided downstream of the second cell stack.

As illustrated in FIG. 8, in the first cell stack 10a, a plurality of the fuel cells 1a are disposed at intervals in line, and current collector members 30 is disposed between the adjacent fuel cells 1a. Consequently, a plurality of the fuel cells 1a is electrically connected in series. Additionally, an end current collector member 30a is adhered to the fuel cells 1a located on the outermost side of the first cell stack 10a. Similarly to this, an end current collector member 30b is adhered to the fuel cells 1b located on the outermost side of the second cell stack 10b. On one side of the fuel cell stack device 100, the end current collector member 30a of the first cell stack 10a is connected to the end current collector member 30b of the second cell stack 10b through the connecting current collector member 32. Consequently, the fuel cells 1a composing the first cell stack 10a, and the fuel cells 1b composing the second cell stack 10b are connected in series. A current generated from the end current collector member 30a of the first cell stack 10a on the other side of the fuel cell stack device 100, and the end current collector member 30b of the second cell stack 10b is extracted. The fuel cells 1a composing the first cell stack 10a, and the fuel cells 1b composing the second cell stack 10b are connected in series in this embodiment, but can be connected in parallel.

The gas flow path (inner flow path) that penetrates from a first end to a second end is formed in each fuel cell 1a. The fuel cell 1a includes a columnar conductive support substrate 34 having a pair of facing flat surfaces, a fuel side electrode layer 36 formed on one of the flat surfaces of the support substrate 34, a solid electrolyte layer 38 formed on an outer surface of the fuel side electrode layer 36, and an air side electrode layer 40 formed on an outer surface of the solid electrolyte layer 38. Additionally, an interconnector 42 is provided on the other flat surface of the fuel cells 1a.

Inside the support substrate 34, a gas flow path 34A for allowing fuel gas to flow in the longitudinal direction is formed between both ends. A p-type semiconductor layer 44 is provided on an outer surface of the interconnector 42. The interconnector 42 is connected to the current collector member 30 through the p-type semiconductor layer 44.

The fuel side electrode layer 36 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The solid electrolyte layer 38 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The air side electrode layer 40 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

As the support substrate 34, conductive ceramic, cermet, or the like having high aperture ratio can be used so as to have such gas permeability as to permeate fuel gas up to the fuel side electrode layer 36. The shape of the support substrate 34 may be columnar, or may be cylindrical.

As the p-type semiconductor layer 44, a p-type semiconductor ceramics formed, for example, from at least one type of $LaMnO_3$-based oxide, $LaFeO_3$-based oxide, $LaCoO_3$-based oxide, or the like existing Mn, Fe, Co, or the like at the B site can be used.

As the interconnector 42, lanthanum chromite-based perovskite type oxide ($LaCrO_3$-based oxide), lanthanum-strontium-titanium-based perovskite type oxide ($LaSrTiO_3$-based oxide), or the like can be used.

The configuration of the first cell stack 10a, and the configuration of the second cell stack 10b are the same except that the numbers of the fuel cells, the lengths in the arrangement direction of the fuel cells are different. As illustrated in FIG. 3 to FIG. 6, the first cell stack 10a and the second cell stack 10b are disposed such that the arrangement direction of the fuel cells 1a, 1b are in parallel. As illustrated in FIG. 9, the longitudinal lengths (heights) of the fuel cells 1a composing the first cell stack 10a are longer than the longitudinal lengths of the fuel cells 1b composing the second cell stack 10b.

The number of the fuel cells 1a composing the first cell stack 10a is less than the number of the fuel cells 1b composing the second cell stack 10b. Therefore, the lengths (lateral lengths) in the arrangement direction of the fuel cells 1a of the first cell stack 10a are shorter than the lateral lengths of the second cell stack 10b. In the following description, the arrangement directions of the fuel cells 1a, 1b are each simply referred as the "arrangement direction".

The position of the first end in the arrangement direction on the upstream side (right front side in FIG. 3) of the reformer 12 of the first cell stack 10a, and the position of the first end in the arrangement direction on the upstream side of the reformer 12 of the second cell stack 10b are aligned in the arrangement direction. On the other hand, the position of the second end in the arrangement direction of the first cell stack 10a is located inside the position of the second end in the arrangement direction of the second cell stack 10b in the arrangement direction. As illustrated in FIG. 5, on the second end side in the arrangement direction of the first cell stack 10a, an insulating material 46 is provided between a position equivalent to the second end in the arrangement direction of the second cell stack 10b and the second end in the arrangement direction of the first cell stack 10a.

Upper parts of the fuel cells 1b composing the second cell stack 10b are opened, and the combustion section 18 is formed above the second cell stack 10b. In the combustion section 18, fuel gas that was not used for electrical generation is combusted.

As illustrated in FIG. 3 to FIG. 7, and FIG. 9, the reformer 12 includes a vaporizing section 12A, and a reforming section 12B. Raw material gas, and water or water vapor are supplied from the outside to the reformer 12 through supply lines 13A, 13B. The vaporizing section 12A heats water with combustion heat of the combustion section 18 to generate water vapor.

The reforming section 12B is filled with a reforming catalyst for reforming mixed gas. Appropriate reforming catalysts are used, such as those in which nickel is imparted to the surface of aluminum spheres, or ruthenium is imparted to aluminum spheres. The reforming section 12B reforms supplied raw material gas by the combustion heat of the combustion section 18 with water vapor into fuel gas containing hydrogen. As illustrated in FIG. 7, the reforming section 12B is not located above the first cell stack 10a, but located only above the second cell stack 10b. Furthermore, in this embodiment, the whole of the reformer 12 is not located above the first cell stack 10a, but located so as to cover only the top of the second cell stack 10b (i.e., the vaporizing section 12A, a flange around the vaporizing section, and the like are also located only above the second cell stack 10*b*). The reformer 12 is held so as to keep a bottom surface horizontal. The reformer 12 is located above the first manifold 2*a* and the second manifold 2*b*.

As illustrated in FIG. 10, the first manifold 2*a* comprises a housing 22, a frame 24, and a distribution pipe 20. The housing 22 is made hollow, an opening 22A having approximately the same shape as the frame 24 is formed in a lower end surface. The first manifold 2*a* is held so as to keep the bottom surface of the housing 22 horizontal.

In the frame 24, a plurality of openings 24A each having approximately the same shape as the sectional shape of each fuel cell 1*a* composing the first cell stack 10*a* are formed. All the upper ends of the fuel cells 1*a* composing the first cell stack 10*a* are connected to the openings 24A formed in the frame 24. The frame 24 is mounted on the opening 22A formed in the housing 22. The connecting structure between the first manifold 2*a* and the upper ends of the fuel cells 1*a*, which includes the connecting structure of the housing 22 and the frame 24 of the first manifold 2*a*, is similar to the connecting structure of the second manifold 2*b* and the lower ends of the fuel cells 1*a*, which will be described below.

An upstream end of the distribution pipe 20 is connected to the connecting section 14 so as to enable fuel gas to move, and reformed fuel gas is supplied to. In the distribution pipe 20, a plurality of openings 20A are formed at intervals in the longitudinal direction. The opening areas of the plurality of openings 20A increase toward the upstream side. Consequently, fuel gas is evenly distributed up to a downstream end of the first manifold 2*a*, and the fuel gas is evenly supplied to the respective fuel cells 1*a* composing the first cell stack 10*a*. That is, the distribution pipe 20 functions as a distribution mechanism for evenly supplying fuel gas to the first fuel cells 1*a*. The distribution mechanism is not limited to the configuration of this embodiment. For example, the distribution mechanism can be constructed by providing a plurality of partition plates inside the first manifold 2*a* so as to cover the inner flow path, and providing, in the plurality of partition plates, openings whose sizes increase toward a tip.

The connecting section 14 is configured integrally with the reformer 12 and the first manifold 2*a* without any joints, and mutual inner flow paths are connected so as to enable fuel gas to move. Additionally, the connecting section 14 has a curved shape inclined downward from the reformer 12 toward the first manifold 2*a*.

As illustrated in FIG. 9, the second manifold 2*b* includes a housing 50, a first frame 52, and a second frame 54. The housing 50 is constructed by connecting a lower housing 50*a* and an upper housing 50*b* to each other so as to form a space therein. In the upper housing 50*b*, a first opening 50*c* and a second opening 50*d* are formed on the both sides in the width direction so as to extend in the longitudinal direction and be arranged side by side in the width direction. Additionally, at the center in the width direction of the upper housing 50*b*, a protrusion 50*e* that protrudes downward so as to extend in the longitudinal direction is formed. The first frame 52 is mounted on the first opening 50*c* of the housing 50, and the second frame 54 is mounted on the second opening 50*d*.

In the first frame 52, a plurality of openings 52*a* each having approximately the same shape as the sectional shape of each fuel cell 1*a* composing the first cell stack 10*a* are formed. The lower ends of the plurality of fuel cells 1*a* composing the first cell stack 10*a* are connected to the openings 52*a* formed in the first frame 52. Additionally, in the second frame 54, a plurality of openings 54*a* each having approximately the same shape as the sectional shape of each fuel cell 1*b* composing the second cell stack 10*b* are formed. The lower ends of the plurality of fuel cells 1*b* composing the second cell stack 10*b* are connected to the openings 54*a* formed in the second frame 54.

As illustrated in FIG. 11, a stress absorbing mechanism 52*b* is formed in the second manifold 2*b*. The stress absorbing mechanism 52*b* is formed in the first frame 52 which is a member, to which the plurality of fuel cells 1*a* composing the first cell stack 10*a* are connected, among members forming the second manifold 2*b*. The stress absorbing mechanism 52*b* is formed around the openings 52*a* to which the fuel cells 1*a* of the first frame 52 are connected. In the stress absorbing mechanism 52*b*, a portion around each opening 52*a* of the first frame 52 is formed in a bellows shape. Additionally, the plate thickness of a portion forming the stress absorbing mechanism 52*b* of the first frame 52 is thinner than the plate thickness of other portion composing the second manifold 2*b*, namely, the plate thickness of the housing 50. Consequently, the stress absorbing mechanism 52*b* can be elastically deformed, and it is possible to absorb stress generated in the fuel cells 1 by the first manifold 2*a* and the second manifold 2*b* fixing the both ends of each of the fuel cells 1*a* of the first cell stack 10*a*.

Such a stress absorbing mechanism is provided not only in the connecting section of the lower ends of the fuel cells 1*a* composing the first cell stack 10*a* and the second manifold 2*b*, but also in the connecting section of the upper ends of the fuel cells 1*a* composing the first cell stack 10*a* and the first manifold 2*a*. However, the stress absorbing mechanism does not need to be provided in both the connecting section of the fuel cells 1*a* and the first manifold 2*a* and the connecting section of the fuel cells 1*a* and the second manifold 2*b*, but may be provided in one of the connecting sections. In a case where the stress absorbing mechanism is provided only in one of the connecting sections, the stress absorbing mechanism is preferably provided in the connecting section of the upper ends of the fuel cells 1*a* and the first manifold 2*a*.

As illustrated in FIG. 9, the first frame 52 is disposed so that an outer peripheral edge thereof overlaps with an edge of the first opening 50*c* of the housing 50, and the outer peripheral edge of the first frame 52 and the edge of the first opening 50*c* are connected by a glass seal 56*a*. Additionally, in the first frame 52, an inner surface of a cylindrical portion on an inner peripheral side, and outer surfaces of the lower ends of the fuel cells 1*a* are connected by glass seals 56*b*.

The partition plate 60 is formed of a hollow plate material having a heat-resisting property such as stainless steel, and is formed with an air flow passage 60*a* for supplying air therein. The upper end of the partition plate 60 is connected to an upper surface of the inner housing 92, and the air flow passage 60*a* is in communication with the air flow path 98. Consequently, air for electrical generation is supplied from the upper end to the air flow passage 60*a* through the air flow path 98. The partition plate 60 vertically extends from a height position above the reformer 12 to the vicinity of the lower ends of the first cell stack 10*a* and the second cell stack 10*b*. Consequently, the partition plate 60 can partition between the connecting section of the first manifold 2*a* and the first cell stack 10*a*, and the combustion section 18, and thermal influence added to the connecting section can be reduced.

In the partition plate 60, an upper through hole 60*b* and a lower through hole 60*c* that penetrate a space between facing surfaces 60A, 60B are formed. The upper through hole 60b is formed at a height position above the combustion section 18. Additionally, the lower through hole 60c is formed below the combustion section 18 around an intermediate height position between the first cell stack 10a and the second cell stack 10b. A space on the side of the first cell stack 10a, and a space on the side of the second cell stack 10b are in communication with each other through the upper through hole 60b and the lower through hole 60c.

A lower end injection hole 60d is formed in a lower end of the partition plate 60. A first air injection hole 60e is formed in the surface 60A on the first cell stack 10a side of the partition plate 60, and a second air injection hole 60f is formed in the surface 60B on the second cell stack 10b side of the partition plate 60. The first air injection hole 60e is formed at a height position equivalent to a lower portion of the first cell stack 10a. The second air injection hole 60f is formed at a height position equivalent to a lower portion of the second cell stack 10b. These first and second air injection holes 60e, 60f may be a plurality of openings, or may be a single opening. The total area of the second air injection hole 60f formed in the surface 60B on the second cell stack 10b side is larger than the total area of the first air injection hole 60e formed in the surface 60A on the first cell stack 10a side. A larger amount of air supplied to the air flow passage 60a of the partition plate 60 is injected toward the second cell stack 10b compared to the first cell stack 10a.

Furthermore, a third air injection hole 60g directed toward the combustion section 18 is formed in the surface 60B on the second cell stack 10b side of the partition plate 60. The third air injection hole 60g is formed at a height position equivalent to the combustion section 18. Consequently, air supplied to the air flow passage 60a of the partition plate 60 is injected toward the combustion section 18 through the third air injection hole 60g.

The air injection holes 60e, 60f are provided in both of the facing surfaces 60A, 60B of the partition plate 60 in this embodiment, but is not limited to this. The air injection holes 60e, 60f may be provided only in the surface 60B on the second cell stack 10b side.

Hereinafter, the flow of fuel gas and water (water vapor), and the flow of air for electrical generation (oxidant gas) in the fuel cell stack device 100 of this embodiment will be described.

Raw material gas and water (water vapor) are supplied to the reformer 12 from the outside through the supply lines 13A, 13B in the fuel cell stack device 100. The water supplied to the reformer 12 is evaporated by heat of the combustion section 18 in the vaporizing section 12A of the reformer 12. Then, the raw material gas and the water vapor are sent to the reforming section 12B. The raw material gas and the water vapor are reformed into fuel gas containing hydrogen with the heat of the combustion section 18 in the reforming section 12B.

The fuel gas reformed in the reformer 12 is supplied to the distribution pipe 20 of the first manifold 2a through the connecting section 14. The fuel gas supplied to the distribution pipe 20 is injected into the housing 22 through the openings 20A. Herein, the opening areas of the openings 20A increase toward the upstream side, and therefore the fuel gas is evenly injected into the housing 22. Then, the fuel gas injected into the housing 22 is sent from the upper ends into the inner flow path of each fuel cells 1a composing the first cell stack 10a. The fuel gas circulates from the upper ends to the lower ends of the fuel cells 1a, and is discharged from the lower ends into the second manifold 2b. At this time, the respective fuel cells 1a perform electrical generation.

The protrusion 50e protruding downward is formed on an upper surface of the second manifold 2b. This protrusion 50e functions as flow path resistance that reduces the flow path area. Therefore, the fuel gas discharged into the second manifold 2b is dispersed in a chamber 2b1 on the upstream side of the second manifold 2b, and thereafter flows into a chamber 2b2 on the downstream side.

The fuel gas that flows into the chamber 2b2 is sent from the lower ends into the inner flow paths of the fuel cells 1b composing the second cell stack 10b. The fuel gas sent into the fuel cells 1b flows from the lower ends toward the upper ends inside the inner flow paths. At this time, the respective fuel cells 1b perform electrical generation.

The fuel gas that passed through the fuel cells 1b composing the second cell stack 10b and was not used for the electrical generation is discharged from the upper ends of the fuel cells 1b to the combustion section 18. The fuel gas discharged to the combustion section 18 is combusted, and heat generated at this time is used to heat the reformer 12.

Exhaust gas generated by combusting the fuel gas in the combustion section 18 rises upwardly. At this time, the upper through hole 60b is formed in the partition plate 60, so that the exhaust gas is diffused between the first cell stack 10a side and the second cell stack 10b side, and thereby a temperature difference between the exhaust gas on the first cell stack 10a side and the exhaust gas on the second cell stack 10b side is reduced. Then, the exhaust gas flows through the exhaust gas flow path 96 downwardly. At this time, heat exchange is performed between the exhaust gas that flows through the exhaust gas flow path 96 and the air for electrical generation that flows through the air flow path 98, so that the air for electrical generation can be heated. Then, the exhaust gas is discharged from the exhaust gas discharge hole 92a to the outside of the outer housing 94.

Next, the air for electrical generation is sent from the outside into the air flow path 98 through the air inflow hole. The air sent into the air flow path 98 flows through the air flow path 98 upwardly. At this time, heat exchange with the exhaust gas flowing in the exhaust gas flow path 96 is performed, and the air is heated. The air that reaches an upper portion of the air flow path 98 is sent from the upper end of the partition plate 60 to the air flow passage 60a.

The air for electrical generation sent into the air flow passage 60a is injected toward the first cell stack 10a and the second cell stack 10b through the first and second air injection holes 60e, 60f and the lower end injection hole 60d. At this time, the total area of the second air injection hole 60f formed in the surface 60B on the second cell stack 10b side is larger than the total area of the first air injection hole 60e formed in the surface 60A on the first cell stack 10a side, and therefore a larger amount of the air is injected toward the second cell stack 10b compared to the first cell stack 10a.

Herein, the lower through hole 60c is formed in the partition plate 60, and therefore the air on the first cell stack 10a side, and the air on the second cell stack 10b side are mixed. Consequently, it is possible to suppress occurrence of temperature unevenness of the air for electrical generation.

The air for electrical generation sent into the air flow passage 60a is injected from the third air injection hole 60g toward the combustion section 18. Consequently, it is possible to completely combust the fuel gas, which was not used for electrical generation, in the combustion section 18.

As described above, according to this embodiment, the following effects are exhibited.

According to this embodiment, fuel gas used in the first cell stack 10a flows into the second cell stack 10b, and is further consumed, namely, the fuel gas is consumed in two stages, and therefore it is possible to increase the fuel utilization rate. Additionally, the fuel gas can be consumed in the two stages without largely changing the arrangement of the fuel cells 1a, 1b, and therefore it is possible to provide a fuel cell stack device having high power generation efficiency, and easily manufactured.

According to this embodiment, fuel gas is supplied from the upper end of the first cell stack 10a, and fuel gas recovered by the second manifold 2a is supplied from the lower end of the second cell stack 10b, and therefore it is possible to discharge off-gas from the upper end of the second cell stack 10b. Consequently, it is possible to send the off-gas up to the combustion section 18 without providing a new pipe.

In this embodiment, the fuel cell stack device is made up of only the first cell stack 10a and the second cell stack 10b composed of the plurality of fuel cells 1a and the plurality of fuel cells 1b arranged in one line, respectively. Thus, according to this embodiment, the fuel cell stack device is made up of only two lines of the cell stacks 10a, 10b, and therefore it is possible to miniaturize the fuel cell stack device.

Now, a fuel cell stack device according to a second embodiment of the present invention will be described.

First, fuel cells used in the second embodiment of the present invention will be described with reference to FIG. 12 and FIG. 13.

(Fuel Cell)

Figure 12:
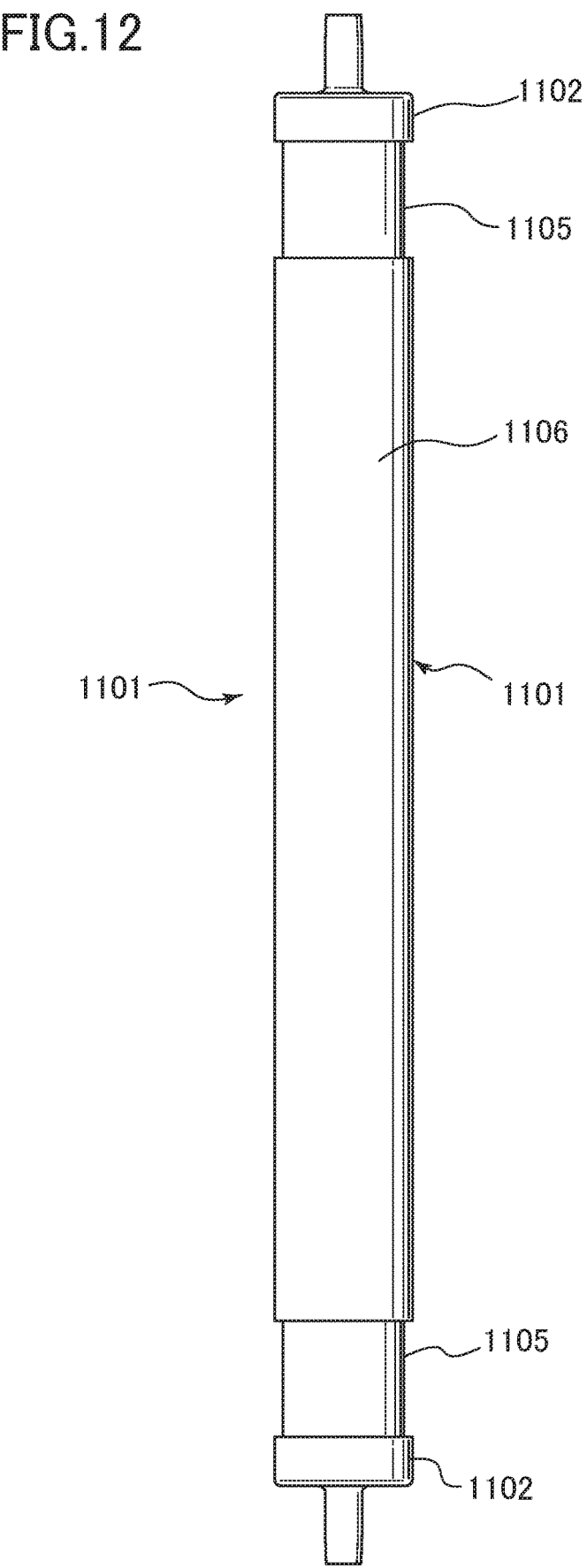
FIG. 12 is a diagram illustrating a fuel cell according to a second embodiment of the present invention.

FIG. 12 is a diagram illustrating a fuel cell (hereinafter simply referred to as a cell) constituting the fuel cell stack device according to the second embodiment of the present invention. FIG. 13 is an enlarged sectional view of a cell end.

As illustrated in FIG. 12, a cell 1001 includes a cell body 1101, and caps 1102 (also referred to as metal caps) that are connection electrode sections connected to respective both ends of this cell body 1101.

Figure 13:
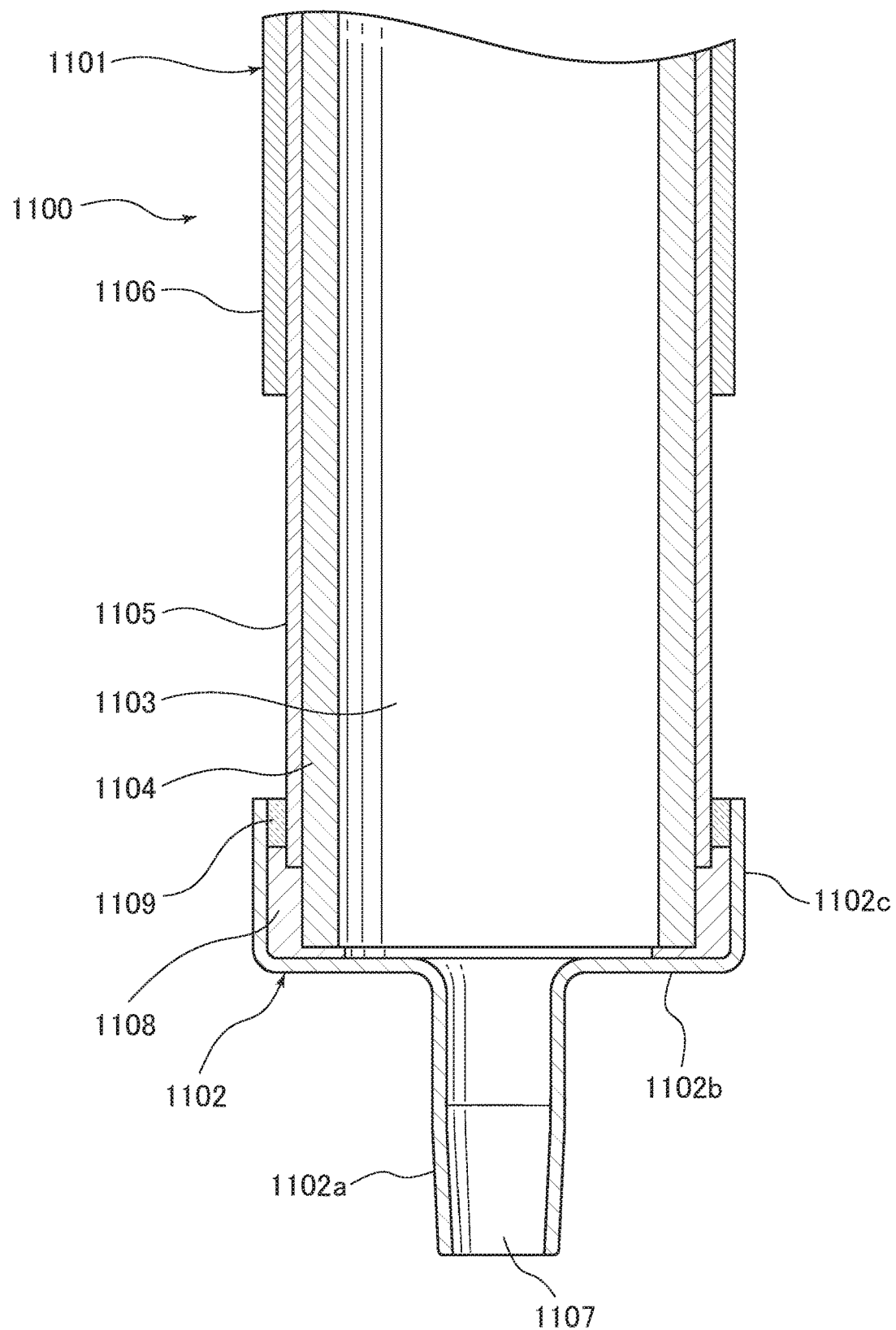
FIG. 13 is a diagram illustrating the fuel cell according to the second embodiment of the present invention.

As illustrated in FIG. 13, the cell body 1101 having a conductive support as a support includes an inside electrode layer 1104, that is a tubular structure extending in the vertical direction, and is a cylindrical fuel electrode layer formed with a fuel gas flow path 1103 (also referred to as an inner flow path) as a gas passage therein, an electrolyte layer 1105 that is a cylindrical solid electrolyte layer provided on an outer periphery of the inside electrode layer 1104, and an outside electrode layer 1106 that is a cylindrical air electrode (oxidant gas electrode) layer provided on an outer periphery of the electrolyte layer 1105. This inside electrode layer 1104 functions as a support composing the cell body 1101, and is a porous body composing the gas passage for allowing fuel gas to flow therein. The inside electrode layer 1104 is a fuel electrode, and is a (−) pole, while the outside electrode layer 1106 is an air electrode which contacts the air, and is a (+) pole.

The inside electrode layer 1104 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu. In this embodiment, the inside electrode layer 1104 is formed of Ni/YSZ.

As the support, a porous insulating support can be used. In this case, as the inside electrode layer, the fuel electrode layer is formed outside the insulating support.

The electrolyte layer 1105 is formed over a whole periphery along an outer peripheral surface of the inside electrode layer 1104, and has a lower end that ends above a lower end of the inside electrode layer 1104, and an upper end that ends below an upper end of the inside electrode layer 1104. The electrolyte layer 1105 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 1106 is formed over a whole periphery along an outer peripheral surface of the electrolyte layer 1105, and has a lower end that ends above the lower end of the electrolyte layer 1105, and an upper end that ends below the upper end of the electrolyte layer 1105. The outside electrode layer 1106 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Now, the caps 1102 will be described. The caps 1102 mounted on the upper end side and the lower end side of the cell body 1101 have the same structure, and therefore the cap 1102 mounted on the lower end side of the cell body 1101 will be specifically described herein.

The respective caps 1102 (metal caps) are provided so as to surround the upper and lower ends of the cell body 1101, are electrically connected to the inside electrode layer 1104 of the cell body 1101, and function as connection electrodes that leads out the electrode layer 1104 to the outside. As illustrated in FIG. 13, the cap 1102 provided in the lower end of the cell body 1101 has a first cylindrical section 1102a having a cylindrical shape, an annular section 1102b extending outwardly from an upper end of the first cylindrical section 1102a and having an annular shape, and a second cylindrical section 1102c extending upwardly from an outer periphery of the annular section 1102b. At a central portion of the first cylindrical section 1102a of the cap 1102, a fuel gas flow path 1107, that is in communication with a fuel gas flow path 1103 of the inside electrode layer 1104, is formed. The fuel gas flow path 1107 is an elongated pipe line provided so as to extend in the axial direction of the cell body 1101 from the center of the cap 1102.

In the cap 1102, an inner peripheral surface and an outer peripheral surface of a body made of ferritic stainless steel or austenitic stainless steel are coated with chromium oxide ($Cr_2O_3$, in this embodiment), and the outer peripheral surface is further coated with $MnCo_2O_4$. In addition, an Ag current-collecting film is provided on the outer peripheral surface of a coated $MnCo_2O_4$ layer. The Ag current-collecting film is provided over the whole of the outer peripheral surface of the cap 1102 in this embodiment, but may be provided in only a part of the outer peripheral surface.

Silver paste 1108 is disposed in a space between the inside of the second cylindrical section 1102c of the cap 1102, and an end outer peripheral surface of the inside electrode layer 1104 of the cell body 1101. By firing after the cell 1001 is assembled, the silver paste 1108 is sintered so that the inside electrode layer 1104 and the cap 1102 are electrically mechanically connected to each other. Additionally, a glass seal 1109 made of a glass material is provided between an inner peripheral surface of the second cylindrical section 1102c of the cap 1102, and a lower end outer peripheral surface of the electrolyte layer 1105. This glass seal 1109 airtightly seals a space between the cap 1102 and the inside electrode layer 1104 with respect to a space of the outside of the cell 1001.

(Fuel Cell Stack Device)

Figure 14A:
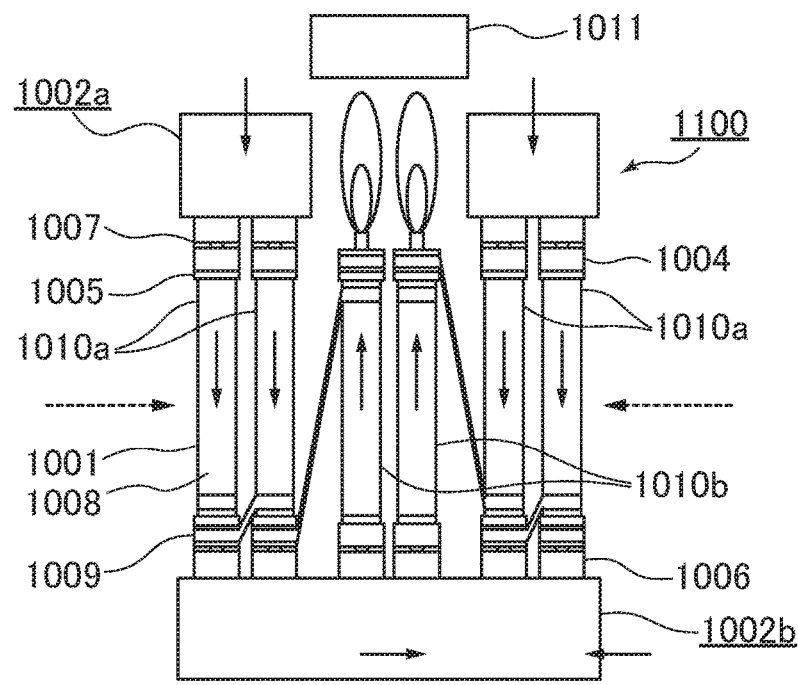
FIGS. 14A through 14D are side views illustrating a fuel cell stack device according to the second embodiment of the present invention.
Figure 14B:
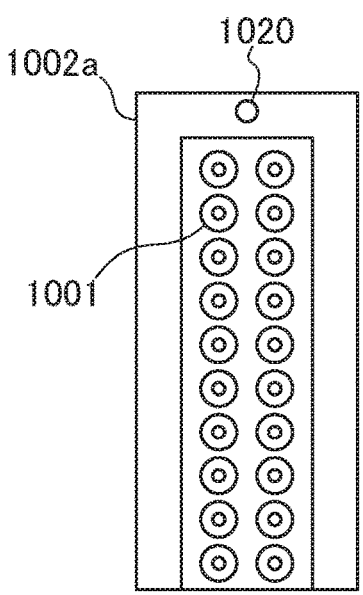

FIG. 14A and FIG. 14B each illustrate the fuel cell stack device in this embodiment. As to the configuration of the cell group arrangement of the above fuel cell stack device 100 of FIG. 1, a cell group 1010a, a cell group 1010b, and a cell group 1010a are sectioned to be arranged in this order in the width direction (short side direction) of a fuel cell stack device 1100, the cell group 1010a on the right and the cell group 1010a on the left in FIG. 14A are connected on the rear side of a paper surface of FIG. 14. Therefore, a manifold 1002b, to which a plurality of cells 1001 disposed in the cell group 1010a are connected and fixed, has a U-shape in top view (FIG. 14B).

Figure 14C:
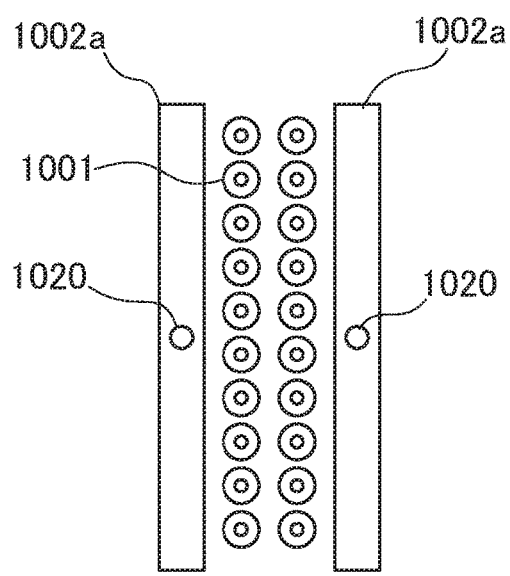
Figure 14D:
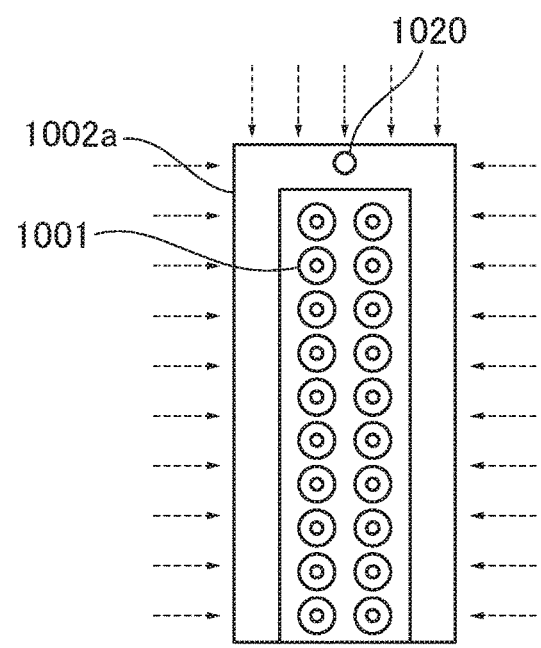
Figure 15A:
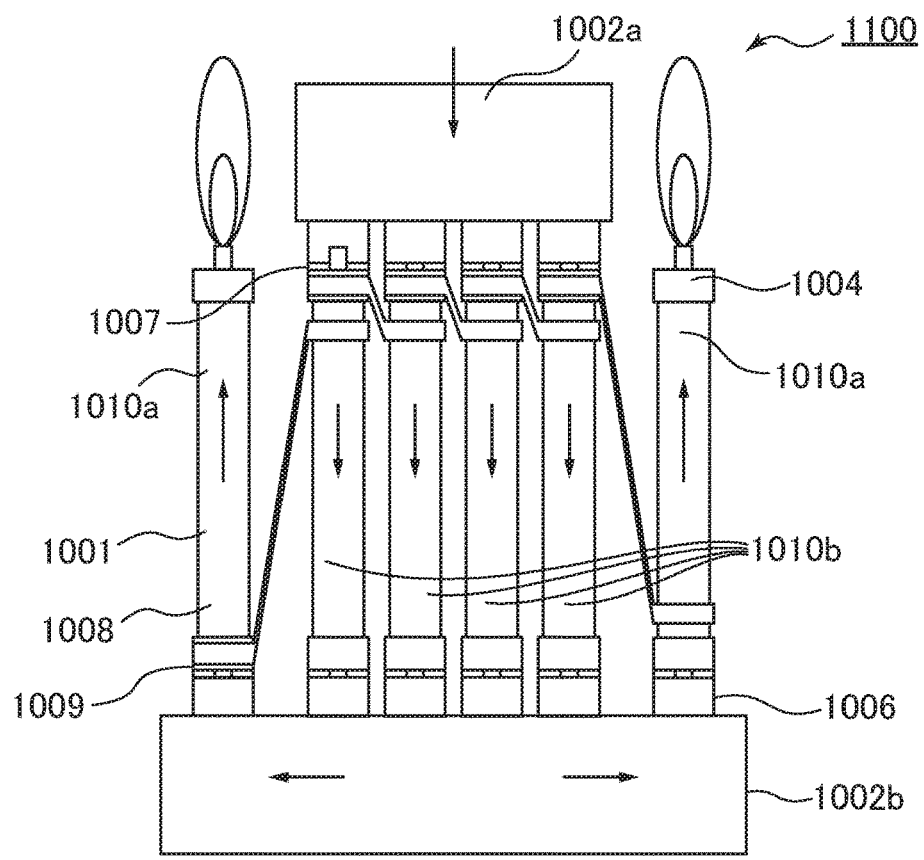
FIGS. 15A and 15B are side views illustrating a fuel cell stack device according to the second embodiment of the present invention.
Figure 15B:
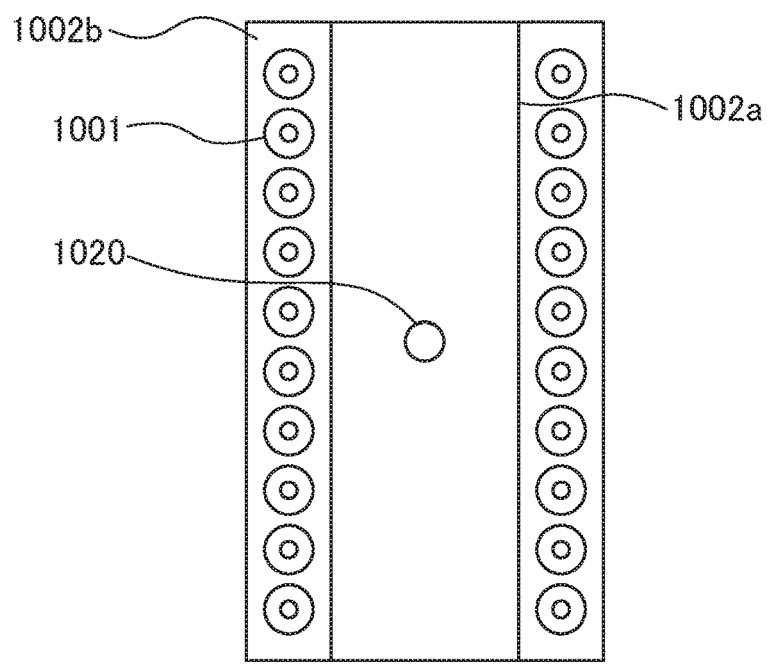

The cell 1001 is cylindrical, and includes metal caps 1004 electrically connected to both ends of a fuel electrode 1003, and the metal cap 1004 and the cell 1001 are sealed by a glass material (not illustrated in FIG. 13 to FIG. 15). The cell 1001 is erected on the manifold 1002b through the insulating support member 1006 (also referred to as a bush), and is airtightly fixed by a glass ring 1007. Second ends of some of the cells 1001 are disposed below a U-shaped manifold 1002a in top view through insulating support members 1006, and airtightly joined with the glass rings 1007.

In electric connection of the plurality of cells 1001, the metal caps 1004 and ends of the air electrodes 1008 are electrically connected in series through the current collectors 1009. Herein, when a current distribution in the cells 1001 is considered, the current collectors are desirably installed on the downstream sides of the cells 1001 in the fuel gas flow direction. Therefore, in each cell group 1010a in which fuel gas flows from the second end side to the first end side (the upper end side toward the lower end side in FIG. 14A), the current collectors 1009 are preferably provided on the first end sides (lower end sides). On the other hand, in the cell group 1010b in which fuel gas flows in the direction from the first end side to the second end side (direction from the lower end side to the upper end side in FIG. 14A), the current collectors 1009 are preferably provided on the second end sides. Additionally, in electric connection of the cell group 1010a and the cell group 1010b, connection of the first end sides of the cells 1001 arranged in the cell groups 1010a, and the second end sides of the cells 1001 arranged in the cell group 1010b is required, and therefore connection by current collectors over long distance from the first end sides to the second end sides is required, and therefore the cells in the cell groups 1010a and the cells in the cell group 1010b are preferably separated from each other from the point of view of short circuit prevention to the cells 1001.

As illustrated in FIG. 14B, fuel gas reformed by a reformer 1011 is supplied from a fuel gas supply line 1020 connected to the U-shaped manifold 1002a in top view, is dispersed inside the U-shaped manifold 1002a, and flows through gas flow paths of the upstream side cell groups 1010a, which is connected so as to be in communication with the U-shaped manifold 1002a, from the second end side to the first end side. Fuel gas, that was discharged from the cell group 1010a, and is left unused for electrical generation, is collected in the manifold 1002b, flows through gas flow paths of the downstream side cell group 1010b having the opened second end side from the first end side toward the second end side, and is discharged from the upper end of the cell group 1010b.

As illustrated in FIG. 14C, the rectangular parallelopiped manifold 1002a may be divided into two, and disposed in the second end side. Fuel gas derived from the reformer 1011 is distributed, and is supplied to the fuel gas supply line 1020 of the manifold 2b, so that the fuel gas can be sequentially supplied from the cell group 1010a to the downstream side cell group 1010b.

On the other hand, air for electrical generation is supplied to side surfaces of the plurality of erected cylindrical cells 1001 as the cell group 1010a or the cell group 1010b, from below the cells 1001 (dotted arrows of FIG. 14A). The supplied air for electrical generation flows from the first end sides towards the second end side of the cells 1001, is mixed with unused gas in the upper end of the downstream side cell group 1010b having the opened second end side, and is combusted.

Herein, the air for electrical generation is unlikely to flow in clearances of the plurality of cells 1001 composing the upstream side cell group 1010a on which the manifold 1002a is installed on the second end side, and therefore in consideration of the flow of the air, the upstream side cell group 1010a and the downstream side cell group 1010b are preferably separated by a predetermined distance.

In top view, as illustrated by dotted arrows of FIG. 14D, the air for electrical generation is unlikely to flow just under a region extending in the short side direction of the fuel cell stack in the U-shape manifold 2b, and therefore air supply holes for supplying the air for electrical generation to the plurality of cells 1001 is preferably installed not only on a long side of the fuel cell stack but also on a short side to supply the air for electrical generation.

The fuel gas passes through the manifold 1002a, and is consumed in electrical generation reaction in the upstream side cell group 1010a. Remaining unused gas that is not consumed in the electrical generation reaction passes through the manifold 1002b to be supplied to the downstream side cell group 1010b, and furthermore is consumed in electrical generation reaction in the downstream side cell group 1010b.

As illustrated in FIG. 15, the rectangular manifold 1002a may be disposed on the second end side at the center in top view. Fuel gas derived from the reformer 1011 is distributed to be supplied to the fuel gas supply line 1020 of the manifold 1002a, so that the fuel gas can be sequentially supplied from the cell group 1010a to the downstream side cell group 1010b.

As described above, the two-stage configuration of the cell groups, in which fuel gas is made to flow in from the manifold on the second end side, and unused gas is collected through the manifold on the first end side to be supplied to the cell group on the open side, is attained, so that it is possible to provide a fuel cell stack device having a high fuel utilization rate, to which a configuration of a conventional fuel cell module can be applied with no change by simple adjustment of the number of the cells on the upstream side and the number of the cells on the downstream side without largely restricting or hindering the array of the plurality of cells, electrical series connection of the cells, the flow of air for electrical generation, or the like.

Additionally, a reformer or a vaporizer is disposed in a combustion region, in which off-gas discharged from the fuel cell stack device is combusted, so that it is possible to apply a placement configuration equal to the conventional fuel cell module. Therefore, it is possible to provide a high efficient and high durable fuel cell system capable of being applied to a small sized fuel cell device having output performance of 1 kw.

Now, a fuel cell stack device according to the second embodiment of the present invention will be described with reference to FIG. 16.

In a fuel cell stack device 1200 illustrated in FIG. 16, cylindrical cells 1201a and cells 1201b are stacked in the longitudinal directions of the cells 1201a and the cells 1201b through insulating support members 1206 (also referred to as bushes), and are joined with glass rings 1207. The cells 1201a are erected on a manifold 1202a through insulating support members 1206, and sealed and fixed by the glass rings 1207.

In electric connection of the cells, a metal cap 1204 provided in one cell, and an end of an air electrode 1208 of an adjacent cell are connected in series by a current collector 1209. A plurality of the cells constituting the fuel cell stack device 1200 are composed of a cell group 1210a located in a lower stage, and an upper stage cell group 1210b located above the cell group 1210a. As illustrated in FIGS. 16A, 16B, 16C and 16D, the cells 1201a arranged as the cell group 1210a located in the lower stage are connected in series along the long side direction (refer to FIG. 16A), and the cell 1201a one located on an end is further connected to a cell 1201a adjacent in the short side direction (refer to FIG. 16B). Additionally, the lower stage cells 1201a and the upper stage cells 1201b are connected in series by the current collectors located at upper ends of the lower stage cell group 1210a (refer to FIG. 16C), and the cells 1201b located in the upper stage cell group 1210b are electrically connected in series similarly to the lower stage (refer to FIG. 16D). Power lead lines are provided in the ends of the cells 1201a and the ends of the cells 1201b.

Herein, when current distributions in the cells 1201a and the cells 1201b are considered, a current is preferably collected on the downstream side in the fuel gas flow direction.

Fuel gas is supplied from a fuel gas supply line 1220 to the manifold 1202a, passes through the lower stage cell group 1210a, passes through a flow path communicated via the insulating support members 1206, and flows in the upper stage cell group 1210b.

Additionally, air for electrical generation flows through spaces between the cells 1201a and the cells 1201b from the lower stage side to the upper stage side, and is mixed with unused fuel gas in an upper portion of the fuel cell stack device 1200 to be combusted.

Fuel gas containing hydrogen obtained by the reformer passes through the manifold 1202a to be consumed in electrical generation reaction in the lower stage cell group 1210a. Remaining unused gas that is not consumed in electrical generation reaction passes through the insulating support members 1206 to be supplied to the upper stage cell group 1210b, and is further consumed in electrical generation reaction.

Figure 16A:
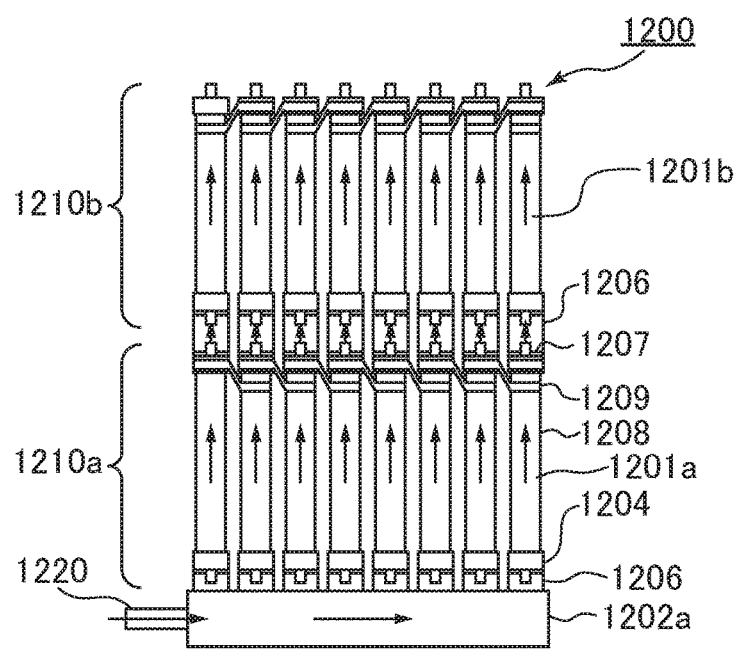
FIGS. 16A through 16E are side views illustrating a fuel cell stack device according to the second embodiment of the present invention.
Figures 16B, 16C:
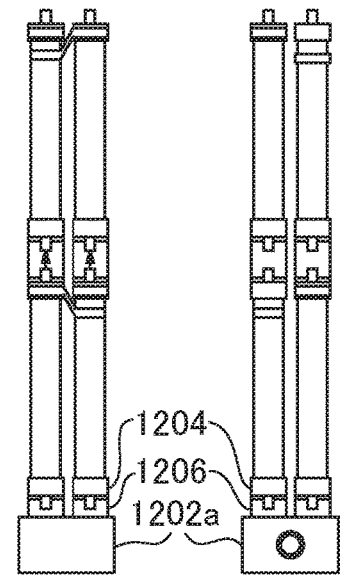
Figure 16D:
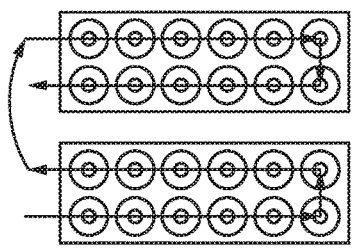
Figure 16E:
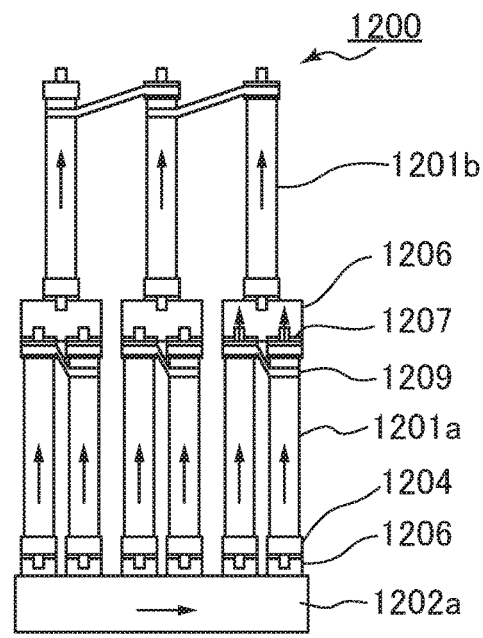

As illustrated in FIG. 16E, a plurality of stacks, each of which is obtained by disposing one insulating support member 1206 for two cells in a lower stage cell group 1210a, and stacking one upper stage cell group 1210b on the insulating bush 1206, may be arranged. Fuel gas containing hydrogen obtained by a reformer is distributed in respective lower stage cells 1201a from the manifold 1202a, passes through the insulating support members 1206, is supplied to the upper stage cell group 1210b, and is further consumed in electrical generation reaction.

Thus, the cells 1201a and the cells 1201b are stacked in the longitudinal directions of the cells, and current paths are formed from the lower stage to the upper stage, so that it is possible to widely ensure an electrical generation area, and make the current distribution even, and it is possible to configure a two-stage cascade type fuel cell, and therefore it is possible to provide a high efficient and high durable fuel cell stack.

Now, a fuel cell stack device according to a third embodiment of the present invention will be described with reference to FIG. 17 and FIG. 18.

Figure 17A:
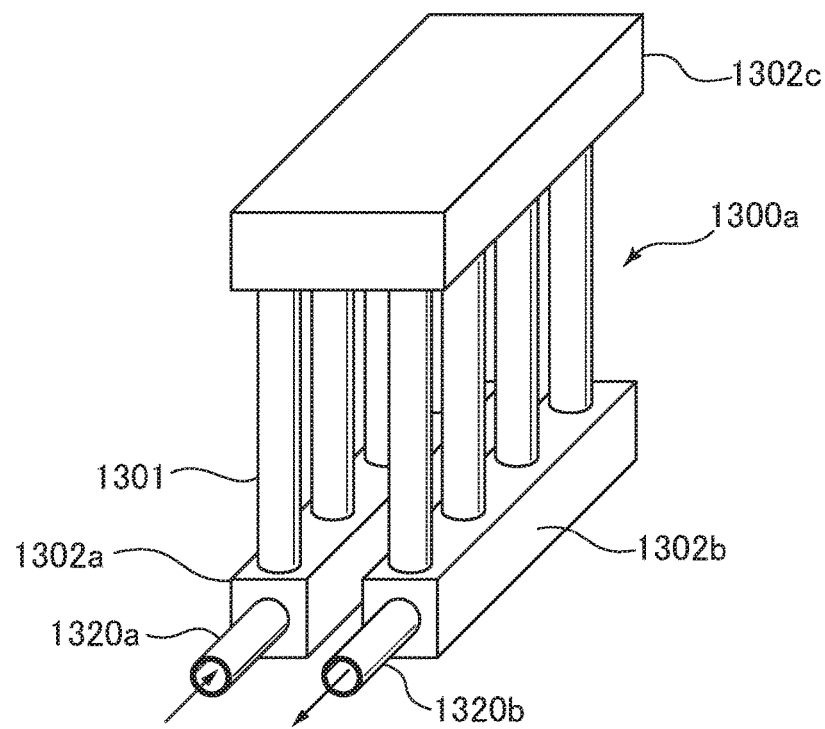
FIGS. 17A through 17C are side views illustrating a fuel cell stack device according to a third embodiment of the present invention.
Figure 17B:
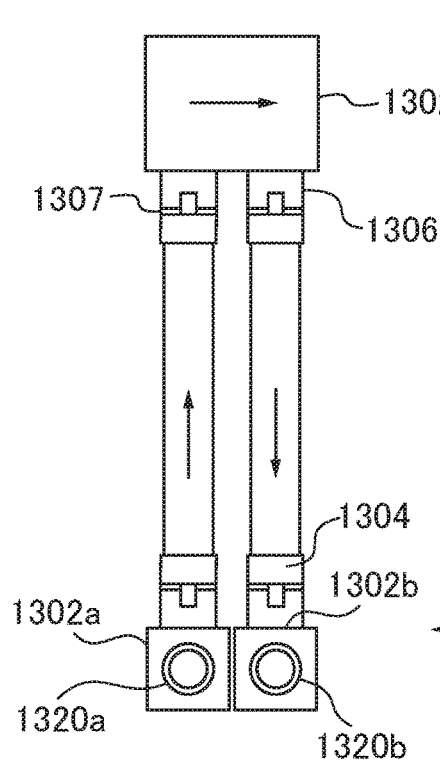
Figure 17C:
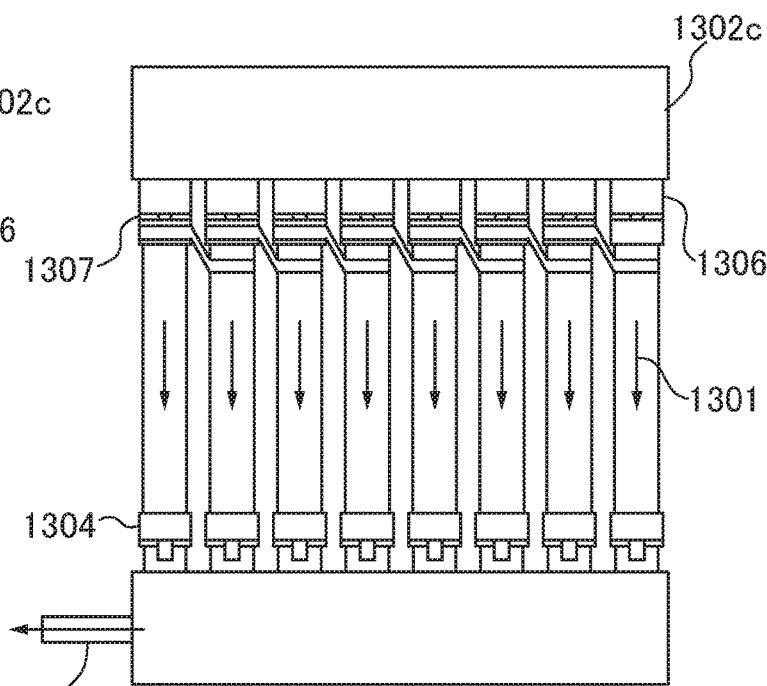
Figure 18A:
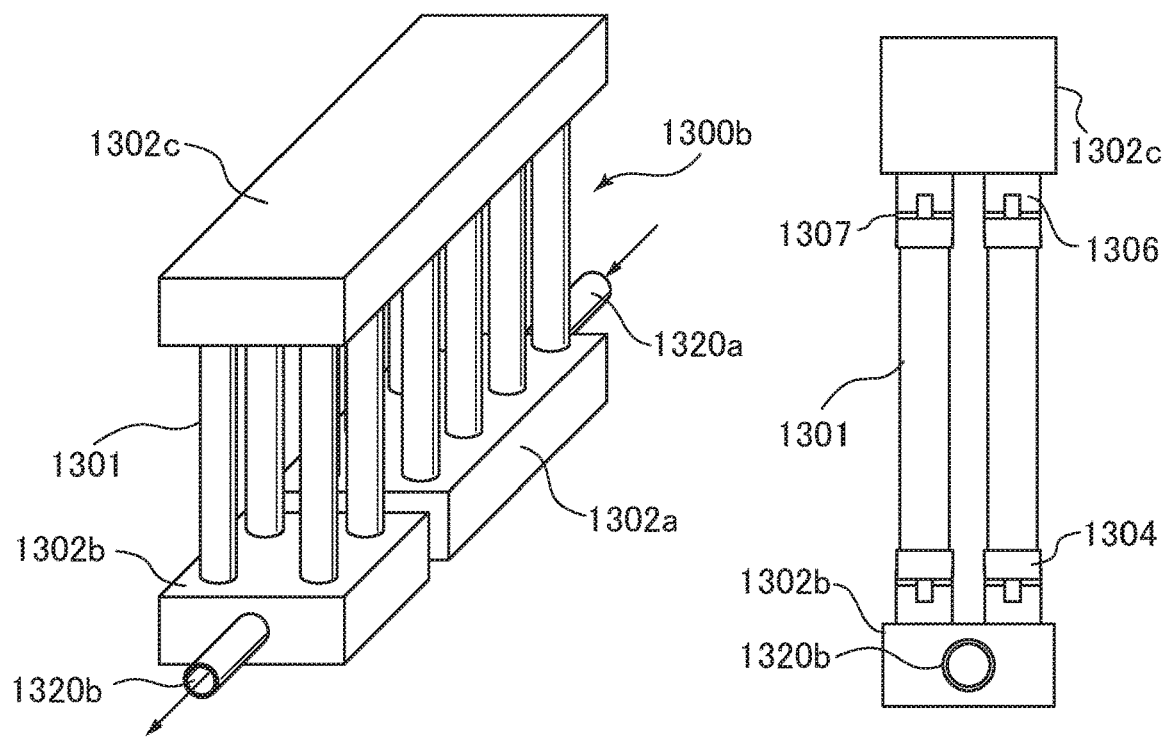
FIGS. 18A through 18C are side views illustrating a fuel cell stack device according to the third embodiment of the present invention.
Figure 18B:
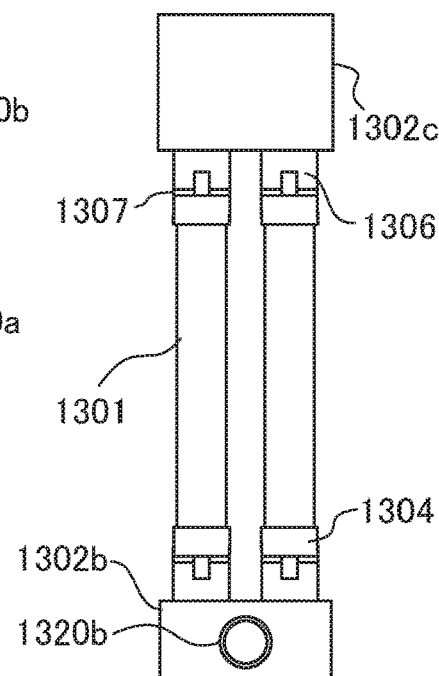
Figure 18C:
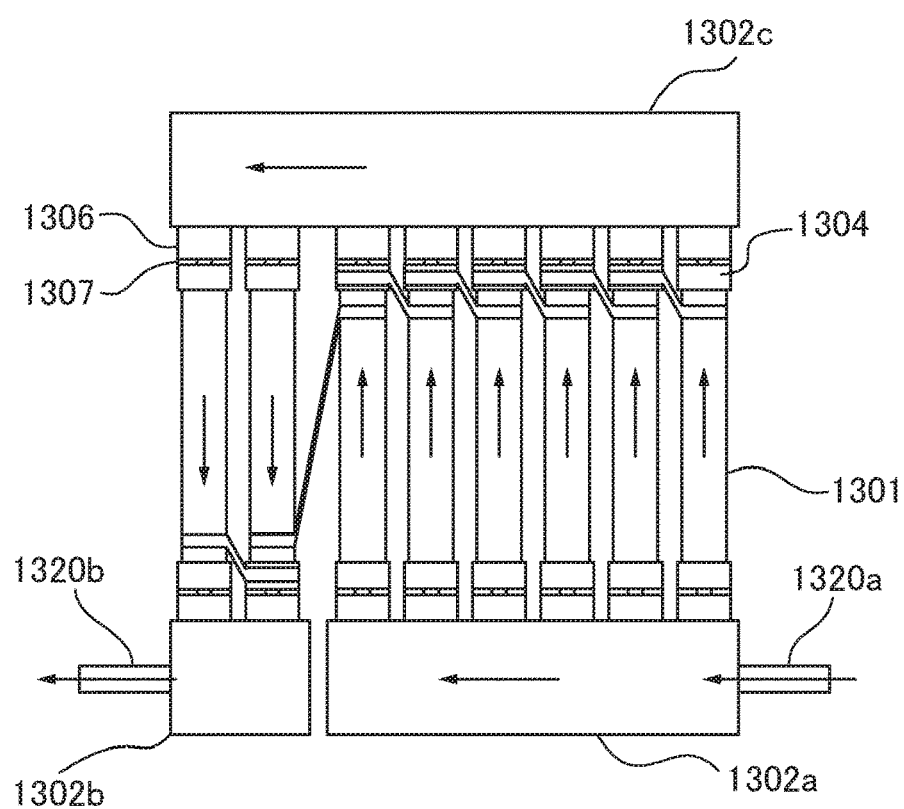

Cylindrical cells 1301 provided in a fuel cell stack device 1300a and a fuel cell stack device 1300b illustrated in FIG. 17 and FIG. 18 respectively each has metal caps 1304 electrically connected to both ends of a fuel electrode (not illustrated), and the metal caps 1304 are airtightly fixed to each of the cells 1301 by glass materials (not illustrated). The cells 1301 are erected on manifolds 1302a, 1302b through insulating support members 1306, and are sealed and fixed by glass rings 1307.

In this embodiment, the plurality of cells 1301 are configured as cell array groups along the long side direction of the fuel cell stack device, and the two cell array groups are disposed in parallel in the short side direction, so that the fuel cell stack device is configured.

In the fuel cell stack device 1300a illustrated in FIG. 17, one of the cell array groups is connected to a manifold 1302a, the cell array group on a second end is connected to a manifold 1302b different from the manifold 1302a. The two cell array groups, whose lower ends are connected to the respective manifolds, are connected to each other through a manifold 1302c provided at an upper side.

In the plurality of cells 1301, a metal cap 1304 of each cell, and an end of an air electrode (not illustrated) of an adjacent cell are connected in series by a current collector 1309. When current distributions in the cells 1301 are considered, a current is preferably collected on the downstream side in the fuel gas flow direction. Therefore, in the cell array group on the upstream side of a fuel gas flow path among the two cell array groups, the current collectors are preferably disposed on the second end sides (upper end sides), and in the cell array groups on the downstream side of the fuel gas flow path, the current collectors are preferably disposed on the first end sides (lower end sides).

Fuel gas containing hydrogen reformed by a reformer is supplied from a fuel gas supply line 1320a of the manifold 1302a, is dispersed inside the manifold 1302a, and flows through gas flow paths of the upstream side cell group connected so as to be in communication with the manifold 1302a from the first end side to the second end side. The fuel gas that passes through the upstream side cell array group passes through the upper manifold 1302c to flow through gas flow paths of the downstream side cell array group from the second end side to the first end side, and unused gas is further collected in the manifold 1302b to be discharged from fuel gas exhaust pipe 1320b.

Thus, fuel gas is supplied from the first end side manifold of one of the cell array groups, and unused gas is collected in the second end side manifold to be supplied to the other cell group, so that it is possible to provide a fuel cell stack device having a high fuel utilization rate, to which a configuration of a conventional fuel cell module can be applied with no change by simple adjustment of the number of the cells on the upstream side and the number of the cells on the downstream side without largely restricting or hindering the array of the plurality of cells, electrical series connection of the cells, the flow of air for electrical generation, or the like.

The fuel cell stack device 1300b illustrated in FIG. 18 is configured such that cell array groups are divided along the short side direction (in the row direction) of the cell arrangement, while the fuel cell stack device 1300a illustrated in FIG. 17 is configured such that the cell array groups are divided along the long side direction (in the column direction) of the cell arrangement. Similarly to the fuel cell stack device 1300a, gas flow paths of the cell groups connected to respective lower manifolds are connected through a manifold disposed on the upper side.

Similarly, fuel gas is supplied from the first end side manifold of one of the cell array groups, and unused gas is collected in the second end side manifold to be supplied to the other cell group, so that it is possible to provide a fuel cell stack device having a high fuel utilization rate, to which a configuration of a conventional fuel cell module can be applied with no change by simple adjustment of the number of the cells on the upstream side and the number of the cells on the downstream side without largely restricting or hindering the array of the plurality of cells, electrical series connection of the cells, the flow of air for electrical generation, or the like.

Figure 19A:
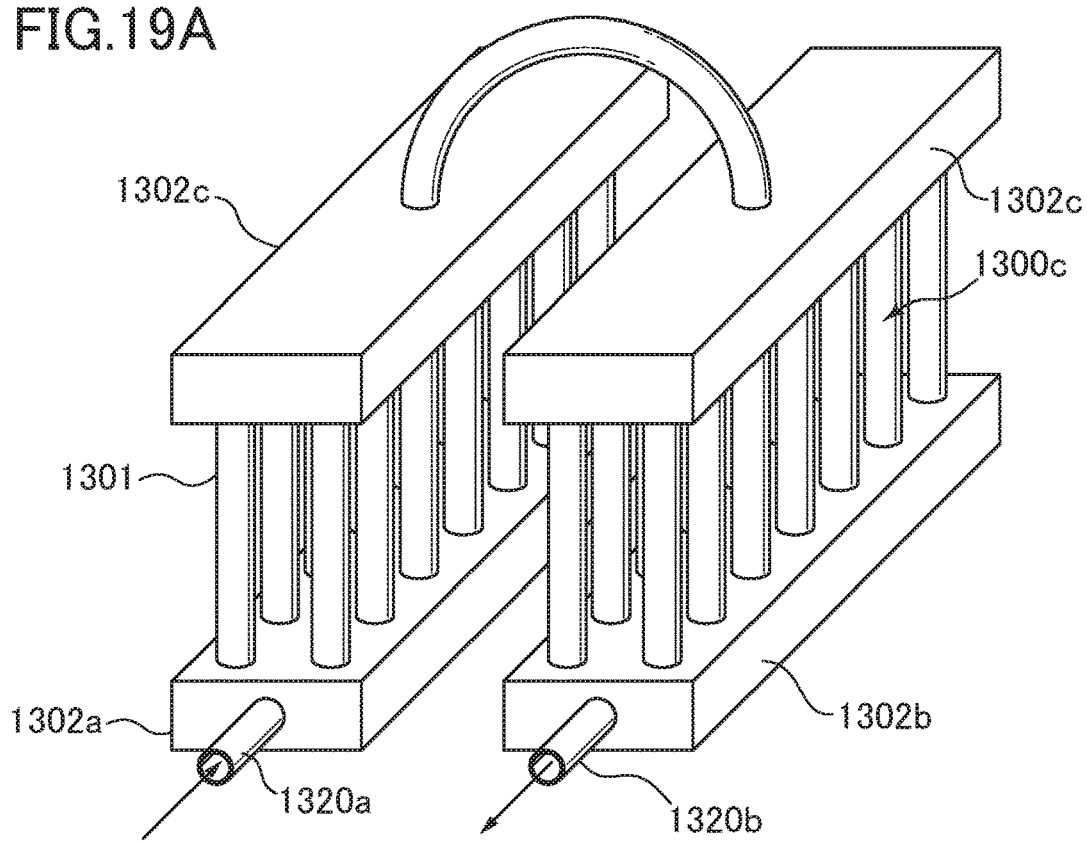
FIGS. 19A and 19B are side views illustrating a fuel cell stack device according to the third embodiment of the present invention.
Figure 19B:
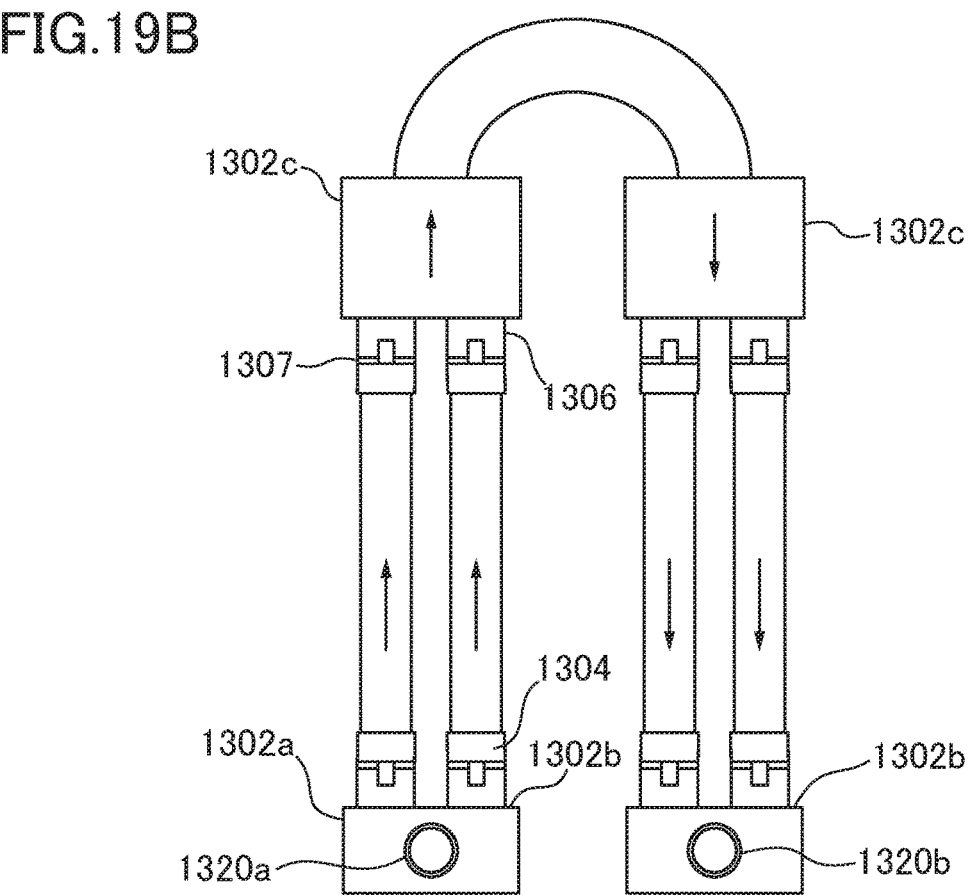

As illustrated in FIG. 19, a fuel cell stack device 1300c may be constructed by disposing manifolds 1302a, 1302b on both ends of cells 1301. A second end side manifold 1302c that collects an upstream side cell array group of the fuel cell stack device 1300c, and a second end side manifold 1302 that collects a downstream side cell array group of the fuel cell stack device 1300c are connected by a connecting pipe. Fuel gas containing hydrogen obtained by a reformer passes through the upstream side cell array group from the manifold 1302a of the fuel cell stack device 1300c, is collected in the second end side manifold 1302c of the upstream side cell array group, passes through the connecting pipe to flow into the downstream side cell array group of the fuel cell stack device 1300c, passes through the downstream side cell array group, and is collected in the first end side manifold 1302b of the fuel cell stack device 1300c to be discharged.

Figure 20A:
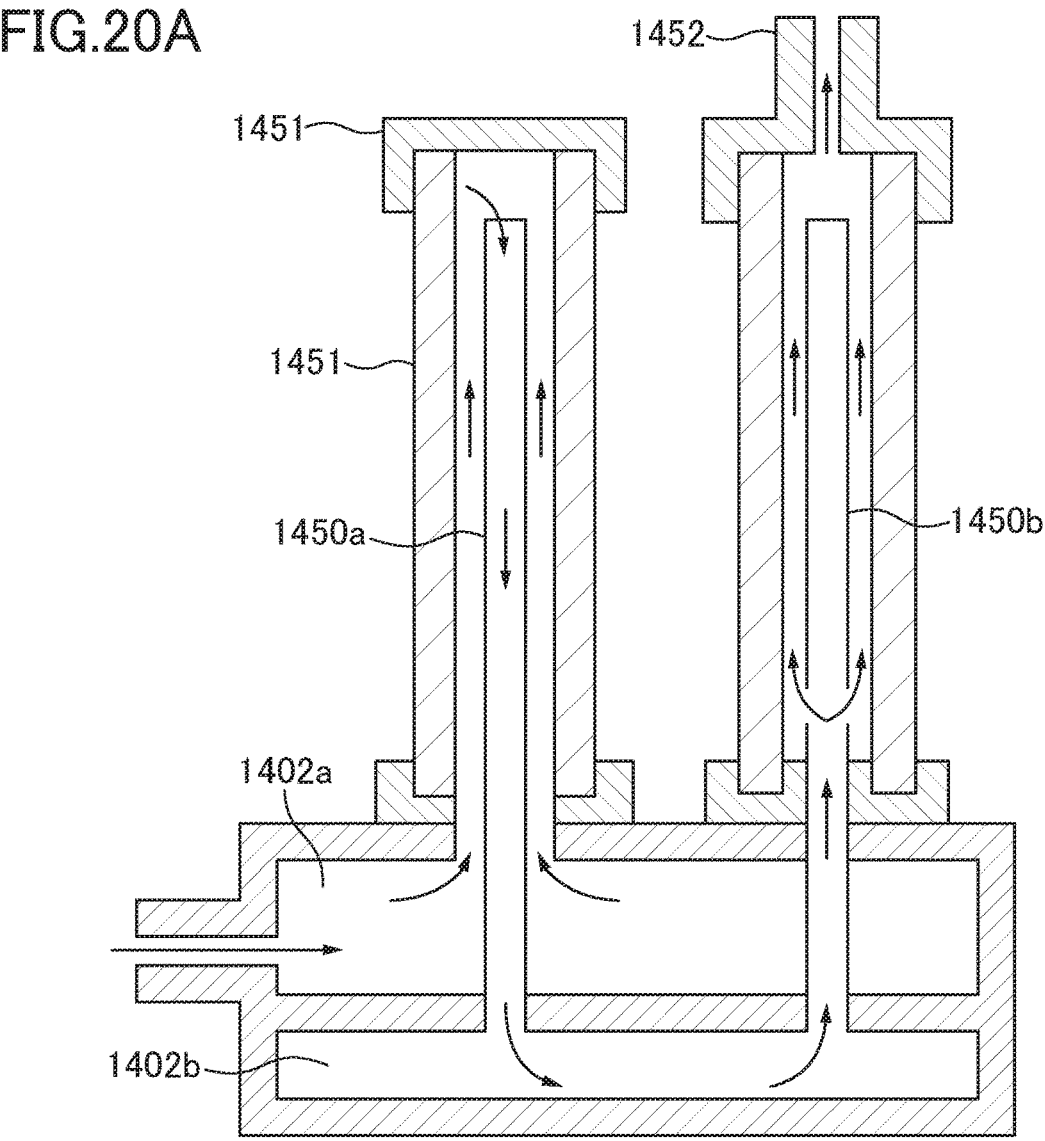
FIGS. 20A and 20B are side views illustrating a fuel cell stack device according to a fourth embodiment of the present invention.

Now, a fuel cell stack device according to a fourth embodiment of the present invention will be described with reference to FIG. 20. FIG. 20A is a sectional view in side view of the fuel cell stack device according to the fourth embodiment of the present invention, and FIG. 20B is a top view of the fuel cell stack device according to the fourth embodiment of the present invention.

Figure 20B:
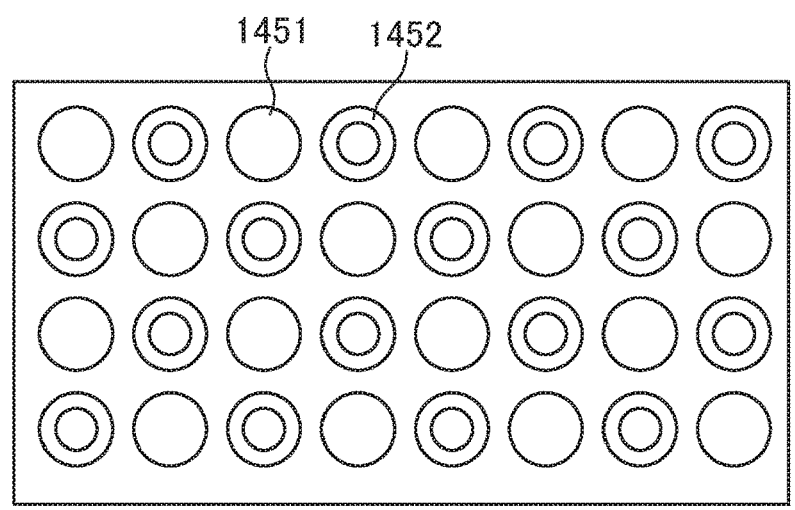

As illustrated in FIGS. 20A and 20B, the inside of a manifold is partitioned into a first supply chamber 1402a and a second supply chamber 1402b, and a first discharge pipe 1450a having an opening on the second end side, and a second discharge pipe 1450b, in which the second end side is sealed and provided with holes for injecting fuel, are provided so as to be in communication with the second supply chamber 1402b. An upstream side cell array group of cells 1401 is installed at a part in communication with the first supply chamber 1402a, and provided with the first discharge pipes 1450a, the first end side of the upstream side cell array group is airtightly fixed to the manifold by glass materials.

Furthermore, the second end side of the upstream side cell array group is sealed by a bottomed cap 1451, a downstream side cell array group of the cells 1401 is installed in the second discharge pipe 1450b in communication with the second supply chamber 1402b, the first end side of the downstream side cell array group is sealed and fixed to the manifold by glass materials, and a communication cap 1452 having a gas flow path is disposed on the second end sides of the downstream cells. Fuel gas supplied from a reformer 11 flows into the first supply chamber 1402a of the manifold, flows between the upstream side cell array group and the first discharge pipe 1450a from the first end side to the second end side, and unused gas of the upstream cells flows from the opening of the first discharge pipe 1450a into the second discharge pipe 1450b. Unused gas collected in the second discharge pipe 1450b flows in a supply line, flows between the downstream side cell array group from the first end side to the second end side, and thereafter discharged from the communication cap 1452 having the gas flow path.

What is claimed is:
1. A fuel cell stack device for generating electricity by reaction between oxidant gas and fuel gas containing hydrogen, the fuel cell stack device comprising:
   a plurality of parallelly arranged columnar fuel cells each having a gas flow path extending inside therethrough in a longitudinal direction of the fuel cell;
   a plurality of cell stacks formed with the plurality of parallelly arranged fuel cells, each cell stack including a first cell stack and a second cell stack arranged orthogonal to the longitudinal direction;
   a reformer configured to reform raw material gas to generate the fuel gas;
   a first manifold configured to supply the fuel gas supplied from the reformer to the plurality of fuel cells provided in the first cell stack, the first manifold being connected to upper ends of the plurality of fuel cells provided in the first cell stack so that the fuel gas from the reformer flows from the first manifold through the gas flow paths running through the plurality of fuel cells provided in the first cell stack, wherein the reformer and the first manifold are formed in one pipe configured to have first and second parallelly arranged linear sections, which correspond to the reformer and the first manifold, respectively, and a U-shaped connecting section connecting an exit of the first linear section and an entrance of the second linear section;
   a second manifold configured to recover the fuel gas discharged from the first cell stack, and supply the recovered fuel gas to the plurality of fuel cells provided in the second cell stack, the second manifold being connected to lower ends of the plurality of fuel cells provided in the first cell stack and lower ends of the plurality of fuel cells provided in the second cell stack so that the fuel gas, which flows through the gas flow paths of the plurality of fuel cells provided in the first cell stack, flows in the second manifold and further flows through the gas flow paths of the plurality of fuel cells provided in the second cell stack, wherein the plurality of fuel cells provided in the second cell stack have upper ends open for discharge of the fuel gas that is left unused for electrical generation by the plurality of fuel cells provided in the first and second cell stacks; and
   a combustion section provided above the upper ends of the plurality of fuel cells provided in the second cell stack and configured to combust the fuel gas discharged from the upper ends of the plurality of fuel cells provided in the second cell stack,
   wherein the reformer is arranged above the plurality of fuel cells of the second cell stack and configured to supply fuel gas to the first manifold, and
   the combustion section is provided between the plurality of fuel cells provided in the second cell stack, and the reformer.
2. The fuel cell stack device according to claim 1, wherein the plurality of cell stacks consist of the first cell stack and the second cell stack, and the first cell stack and the second cell stack are each made up of the plurality of fuel cells arranged in line.

3. The fuel cell stack device according to claim 1, wherein the reformer is provided above the second cell stack.

4. The fuel cell device according to claim 1, wherein in top view, the first manifold extends in a longitudinal direction of the first cell stack, the reformer extends in a long longitudinal direction of the reformer, and the first manifold and the reformer are connected with each other via a connecting section in fluid communication.

* * * * *